United States Patent
Kaushansky et al.

(10) Patent No.: US 10,372,130 B1
(45) Date of Patent: Aug. 6, 2019

(54) COMMUNICATING REASONS FOR VEHICLE ACTIONS

(71) Applicant: Zoox, Inc., Menlo Park, CA (US)

(72) Inventors: Karen Kaushansky, San Francisco, CA (US); Jacob Lee Askeland, San Jose, CA (US); Vasumathi Raman, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 222 days.

(21) Appl. No.: 15/600,258

(22) Filed: May 19, 2017

(51) Int. Cl.
| | |
|---|---|
| *G05D 1/02* | (2006.01) |
| *G05D 1/00* | (2006.01) |
| *B60W 50/00* | (2006.01) |
| *B60W 50/14* | (2012.01) |
| *G06K 9/00* | (2006.01) |
| *B60W 30/02* | (2012.01) |
| *B60W 30/14* | (2006.01) |

(52) U.S. Cl.
CPC ......... *G05D 1/0088* (2013.01); *B60W 30/025* (2013.01); *B60W 50/0098* (2013.01); *B60W 50/14* (2013.01); *G05D 1/0221* (2013.01); *G06K 9/00805* (2013.01)

(58) Field of Classification Search
CPC . G05D 1/0088; G05D 1/0221; B60W 30/025; B60W 50/0098; B60W 50/14; G06K 9/00805

USPC ............................................ 701/27, 23, 442
See application file for complete search history.

(56) References Cited

U.S. PATENT DOCUMENTS

| | | | |
|---|---|---|---|
| 2016/0171894 A1* | 6/2016 | Harvey ................ | G05D 1/0088 701/23 |
| 2017/0234691 A1* | 8/2017 | Abramson ......... | G01C 21/3626 701/442 |
| 2017/0313326 A1 | 11/2017 | Sweeney et al. | |

* cited by examiner

*Primary Examiner* — Tan Q Nguyen
(74) *Attorney, Agent, or Firm* — Lee & Hayes, P.C.

(57) ABSTRACT

Techniques for communicating feedback to passengers of autonomous vehicles regarding reasons for actions taken by autonomous vehicles to build trust with passengers are described herein. For instance, an autonomous vehicle may associate various objects with symbols and/or predicates while traversing a path to evaluate Linear Temporal Logic (LTL) formulae. Events along the path may require the autonomous vehicle to perform an action. The vehicle may determine to communicate the event and/or action to the passenger to provide a reason as to why the autonomous vehicle took the action, based on evaluation of the LTL formulae. In some examples, the autonomous vehicle may communicate with passengers via one or more of visual cues, auditory cues, and/or haptic cues. In this way, autonomous vehicles may build trust with passengers by reassuring and informing passengers of reasons for taking actions either before, during, or after the action is taken.

21 Claims, 6 Drawing Sheets

COMMUNICATING REASONS FOR VEHICLE ACTIONS

BACKGROUND

Autonomous vehicles can improve the safety and efficiency of transportation systems. Autonomous automobiles, for example, may use microprocessors and sensors to make routing and maneuvering decisions. As a result, in many cases these vehicles can react more quickly and accurately to events and changing conditions than a human driver. Thus, autonomous vehicles can travel closer together and at higher speeds, which may provide benefits such as reducing congestion.

Unlike human drivers, autonomous vehicles may not give many of the visual or auditory cues that passengers are accustomed to being provided with while traveling in a vehicle. For example, a human driver may tell their passengers they are going to take a different route due to traffic caused by a car wreck ahead. Additionally, human drivers provide various physical cues as to routing and maneuvering decisions, such as changing the angle of their gaze when turning, or moving their arms to begin to rotate the steering wheel for a turn.

While autonomous vehicles continue to become more prevalent, they have yet to become commonplace. Many people have not experienced travel in an autonomous vehicle and do not trust or understand decisions made by autonomous vehicles, especially in the absence of visual or auditory cues for routing and maneuvering decisions with which human passengers are accustomed. The lack of trust and comfortability that many human passengers have for autonomous vehicles results in reluctance by many humans to adopt autonomous vehicle transportation.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
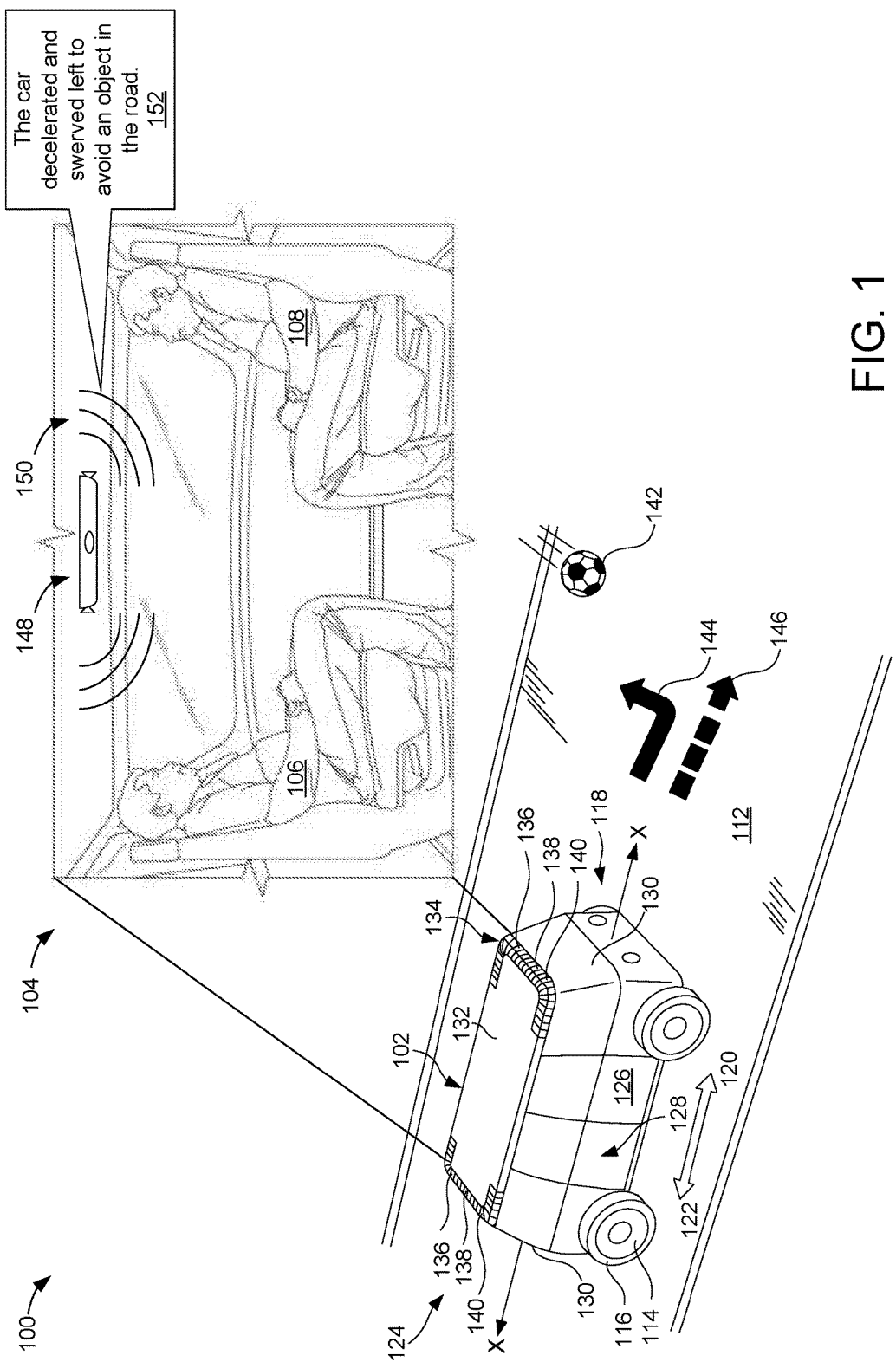
FIG. 1 illustrates an example environment including an autonomous vehicle which detects an event, and provides feedback to passengers regarding the event and an action taken responsive to the event.

As mentioned above, many people have not experienced travel in an autonomous vehicle and have not built up trust with autonomous vehicles. This lack of trust may further be due to the lack of visual, audio, or haptic cues provided to passengers for actions taken by the autonomous vehicles. Because autonomous vehicles may use sensors to "self-drive", it is often not necessary for them to have steering wheels or other mechanisms used by a human driver. As non-limiting examples, these vehicles may use various sensors, such as high-resolution video cameras, LIDAR, RADAR, ultrasonic transducers, and the like to detect lane markings, detect obstacles and other vehicles, as well as localize the vehicle in an environment. Based on their programming, these vehicles may maneuver sharply (e.g., with high rates of longitudinal and/or lateral acceleration) with little or no warning. Additionally, autonomous vehicles may provide no active visual cues (e.g., a driver turning the steering wheel and/or leaning), audio cues (e.g., a driver informing the passenger of a change in route), or haptic cues to allow passengers to anticipate turns and other maneuvers.

To this end, this application describes techniques for communicating feedback regarding reasons for actions taken by an autonomous vehicle to passengers to build trust and comfortability for passengers with autonomous vehicles. The techniques described herein include providing visual, audio, and/or haptic feedback to inform passengers of autonomous vehicles of events and responsive actions that are going to be taken, are being taken, or were recently taken. Generally, events may indicate some change of the state of some interest, such as the world, a system, and/or the environment. As non-limiting examples, an event may comprise an obstacle blocking a path, a predicted collision, or the like. In some examples, one or more modules of an autonomous vehicle may cause audio to be output, such as words or sounds, in the interior the autonomous vehicle to notify the passengers that an action that is responsive to a detected event is going to occur. For instance, the modules may cause audio to be output such as a spoken statement explaining the event and an action to be taken, for example, that the autonomous vehicle will be taking a detour from an originally planned route due to a car wreck that has occurred at a point along the originally planned route. In other examples, visual (e.g., text, images, and/or graphical representations presented on a display) haptic (e.g., vibration or force) notification mechanisms may additionally or alternatively be used. In this way, a passenger can be notified of why the autonomous vehicle makes, or made, an unscheduled turn or turns. In some examples, the modules may employ multiple types of communications employed in conjunction to notify a user of an event and a corresponding action. For instance, the modules may flash lights providing ambient light inside the autonomous vehicle while tightening a seatbelt of the passenger to notify the passenger that the autonomous vehicle is going to take an immediate action, such as swerving to avoid another vehicle. By informing passengers of actions taken by the autonomous vehicle and reasons for these actions, autonomous vehicles may build trust with passengers.

In some examples, the autonomous vehicle may pick up a passenger at a location to take the passenger to a destination. The autonomous vehicle may receive map data (e.g., 3D map data, 2D map data, etc.), route data (e.g., road network data), Route Network Definition File (RNDF) data, Mission Data File (MDF) data, and other types of data usable by an autonomous vehicle for traversing an environment. Additionally, the autonomous vehicle may include various sensors (e.g., LIDAR sensor(s), camera(s) (including, but not limited to, depth cameras, intensity cameras, IR cameras, RGB cameras, stereo cameras, and the like), RADAR(s), microphones(s), GPS/IMU sensor(s), environmental sensor(s), accelerometer(s), gyroscope(s), magnetometer(s), etc.) to obtain sensor data such as measurements of the autonomous vehicle and its environment. Using the map data, route data, RNDF data, MDF data, and/or the sensor data, the modules of the autonomous vehicle may determine a route to traverse from the pick-up location of the passenger to the destination of the passenger. Additionally, the modules of the autonomous vehicle may determine actions, such as new trajectories or maneuvers (e.g., lateral/longitudinal acceleration, velocity, and heading) defining the motion of the autonomous vehicle while traversing the route. In some examples, the sensors may periodically or continuously obtain measurements of the environment to detect events or changes in the map data and/or route data, and adjust the trajectories accordingly to cause the autonomous vehicle to safely traverse the appropriate route.

For example, the modules may receive data from the sensors indicating that an object of interest is in the environment of the autonomous vehicle. The modules may determine that the object is a dynamic object, track the location of the object, and determine that the object has the potential to enter the planned route and trajectory of the autonomous vehicle. For instance, the modules may determine that the data from the sensors indicate that a pedestrian riding a bicycle is moving to intersect the planned route of the autonomous vehicle, that a collision is likely based on the movement of the bicyclist and the autonomous vehicle, and that a change in the planned route must be identified to avoid the collision. As a non-limiting example, an action taken for an event detected may comprise a change in the trajectory of the autonomous vehicle as a result of a potential collision with an object. Such an action may comprise, for example, one or more of altering a route or performing a maneuver to avoid the collision. Other examples of actions responsive to events may include changing a route of the autonomous vehicle to avoid a traffic accident that caused a traffic jam, outputting a sound or light to warn a pedestrian when the autonomous vehicle is getting too close to the pedestrian, applying brakes earlier than scheduled to leave a comfortable distance between a lead vehicle and the autonomous vehicle, slowing down the autonomous vehicle to allow an object detected as moving through a scheduled path of the autonomous vehicle to clear the path, etc.

In examples where an event is detected, the modules of the autonomous vehicle may identify one or more actions to take, such as trajectories that avoid the collision with the bicycle, outputting sound to warn a pedestrian of the presence of the autonomous vehicle, slowing down the autonomous vehicle to avoid a collision, etc. In some examples, the modules of the autonomous vehicle may include a planner module which calculates and evaluates large numbers of actions per unit time, and determines a subset of actions where each action of the subset is associated with a confidence level that the autonomous vehicle may move proceed safely in view of the event.

In some examples, the modules may determine a "cost" associated with each of the actions in the subset based on various factors. The factors used to determine the cost may generally represent results caused by the changes in the trajectory of the autonomous vehicle that may negatively impact the passenger and/or the autonomous vehicle, such as high magnitudes of "jerk" due to rapid acceleration or deceleration of the autonomous vehicle, compliance with traffic rules, route changes, changes in the distance of a new route, changes in the time to traverse a new route, changes in battery life consumed due to a new route, an amount of turns added in a new route, etc.

In some examples, one or more of the modules may continuously determine objects in an environment based, at least in part, on sensor data acquired from sensors located on the autonomous vehicle. Such modules may then map these objects to various symbols and/or predicates. As will be described in detail below, these symbols and/or predicates may then be used to evaluate relevant Linear Temporal Logic (LTL) formulae. Such formulae may be associated with one or more templates, the templates comprising mechanisms to communicate the evaluation of the formula with the passengers.

Additionally, or in the alternative, the modules of the autonomous vehicle may determine a total cost for each of the alternative actions based on any one or more of the factors associated with an action and/or the severity of a factor associated with the action (e.g., a high change in acceleration is a higher cost action compared to a low change in acceleration). For instance, if an autonomous vehicle must swerve to avoid the bicyclist to avoid collision, that may be a relatively high cost due to the high amount of acceleration or deceleration as well as the change in direction associated with a swerving trajectory type action. Conversely, applying the brakes slightly earlier to provide additional room between a lead vehicle and the autonomous vehicle at a stop light may be an action having a relatively low cost. Upon determining a cost for each of the alternative actions, the modules of the autonomous vehicle may utilize an optimization algorithm to determine the optimal action by identifying the alternative action with the lowest cost.

After determining the optimal action, the modules of the autonomous vehicle may determine whether to communicate the event and action with the passenger. Generally, the determination of whether to notify the passenger of the event and any correlating action may be based on the relative cost of the action with respect to the original action to traverse the planned route. For example, if an action of the originally planned route was to simply keep driving straight along a road, and the determined action is to change a trajectory to avoid a collision with a bicycle, the relative cost of the action may be high compared to driving on a straight road and merit notifying the user. Alternatively, if the action is simply to start braking earlier than planned at a stop light to provide additional room between the autonomous vehicle and a lead vehicle, the cost of braking slightly earlier may be only slightly higher than the cost of braking on the originally planned route and would not merit notifying the user. In various examples, the event and action may be reported to a passenger when the relative cost of the determined action compared to the original action or plan is higher than a threshold cost difference. In some examples, the threshold cost difference may be a static amount, while in other examples the threshold cost difference may be dynamic. For instance, based on the familiarity of the passenger with autonomous vehicles (e.g., the passenger has ridden in an autonomous vehicle many times), the threshold cost difference may be raised, resulting in less events and actions being reported to an experience passenger. Other factors may be considered for determining the threshold cost difference, such as the age of a passenger, emotion recognition for a passenger, or various types of physiological and/or demographic information for a passenger.

In various instances, events and actions may always be reported by the modules of the autonomous vehicle. For example, if an event and associated action are not reported to a passenger, but the passenger subsequently asks "what just happened" (e.g., explicit request), the modules of the autonomous vehicle system may notify the user of the event and the action. As another example, various operations performed by the autonomous vehicle that would not ordinarily be performed by a human driver may always be reported to a passenger. For instance, the modules of the autonomous vehicle may experience an event that it is unable to navigate, and may perform an action such as sending a message to a teleoperation service remote from the autonomous vehicle to request services. The request for teleoperation service may include a request to negotiate difficult or unsafe roadway conditions. The teleoperation service may respond to the autonomous vehicle with an action for the autonomous vehicle to take to safely navigate the event. In such examples, the autonomous vehicle may simply pull over to the side of the road while waiting for a response, which may confuse the passenger. Thus, the modules of the autonomous vehicle may notify the user that it is requesting assistance from a teleoperation service to navigate an event.

Upon determining to communicate the event and action to the passenger, the modules of the autonomous vehicle may use various methods for notifying the passenger. For example, the autonomous vehicle may use audio notifications (e.g., voice informing the user of what is happening, a chime or sound indicating an event is occurring, etc.), visual notifications, (e.g., lights interior the autonomous vehicle flashing, text presented on a display of the vehicle explaining the event and action, video or other graphical representation illustrating an example scene of the event and action, etc.), and/or haptic notifications (e.g., vibrations in a seat, force feedback in a seat or other vehicle surface, tugging on a seatbelt, tightening of a seatbelt, etc.).

In some examples, the one or more modules of the autonomous vehicle may perform some of the above-noted operations using stored models or templates which consist of symbols and/or predicates associated with linear temporal logic (LTL) formulae or rules, where each type of LTL formula is associated with a corresponding template. For instance, once the modules have determined a vehicle state (e.g., geographic position, speed, movement direction, etc.) and detects objects in an environment (e.g., intersection, other vehicles, signs, etc.), the objects, object states, autonomous vehicle, autonomous vehicle state, may be associated with or mapped to symbols and/or predicts that are associated with various LTL formulae. In some examples, one or more tables may store all the different ways the symbols and/or predicates can be combined. In some examples, one or more tables may store LTL formulae which indicate safe and/or comfortable operation of the autonomous vehicle. Once the objects, object states, autonomous vehicle, and autonomous vehicle state are mapped to or associated with the corresponding LTL formula or rule, the formula or rule may be evaluated (e.g., "true" or "false"), and an action is performed by the autonomous vehicle based on whether the criteria is met. For instance, if "VehicleANDOtherCarTimingsOverlap" is evaluated to be "true," then an action of notifying a passenger that the autonomous vehicle is changing trajectory to avoid a collision may be performed. In some examples, a response/sentence syntax may further be determined, which indicates how to notify the passenger of the action. For instance, if the above LTL formula is determined to be true, a response may be hard-coded into the instruction to change the trajectory, where the response indicates that the car is to flash lights to notify a passenger, and output audio in the interior of the autonomous vehicle saying, for example, "changing direction because we would collide with the car on our left." In this way, LTL rules may be used to determine actions to take based on data collected from an environment of the autonomous vehicle, and the action may be associated with a response and/or sentence to output to a passenger to notify the passenger of the action.

The templates may encode the semantic meaning of its respective formula in a human-understandable way, and communicate the evaluation of the formula to the passenger in various human recognizable modes. For instance, a particular template may be hardcoded with instructions to output audio to a passenger of the autonomous vehicle, where the audio is a voice explanation of the event and action. Thus, the autonomous vehicle may determine one or more words or phrases which describe the scenario involving the autonomous vehicle (e.g., the event) based on the action to be taken responsive to the event. In some instances, the modules of the autonomous vehicle may determine the semantic meaning of the events and actions of the scenario involving the autonomous vehicle using the one or more LTL templates or models for the scenario. In some examples, a plurality of models for various scenarios may be stored locally at the autonomous vehicle, and/or in a cloud-based service. Based on the sensor data collected and/or the action determined for the autonomous vehicle, a model may be applied or determined by the modules of the autonomous vehicle for the situation the autonomous vehicle is experiencing. In some examples multiple models may be determined for a scenario involving the autonomous vehicle. For example, one model may be determined for the autonomous vehicle itself based on the position, speed, trajectory, and/or other factors of the autonomous vehicle, and another model may be determined for a detected object in the environment based on the position, speed, trajectory, and/or other factors for that object.

Example systems and methods are described below in the context of passenger vehicles (e.g., personal vehicles such as cars and trucks and for hire vehicles such as taxies and shuttles). One of skill in the art will recognize, however, that techniques of the present disclosure are not so limited. Indeed, the systems and methods used herein can also be used for other autonomous ground vehicles, such as buses and trains; and, indeed, for other types of vehicles such as boats and planes. In addition, while the system is described for use with autonomous vehicles with little or no human intervention, the system can be used for non-autonomous vehicles, such as taxies and busses, where passengers may be affected by the driver's actions. As discussed below, the system can be used anytime there may be a communication disconnect between the events involving and actions performed by a vehicle and the passenger's perception.

The systems and methods described hereinafter as making up the various elements of the present disclosure are intended to be illustrative and not restrictive. Many suitable systems, methods, components, and configurations that would perform the same or a similar function as the systems and methods described herein, are intended to be included within the scope of the disclosure. Example implementations are provided below with reference to the following figures.

FIG. 1 illustrates an example environment 100 including a vehicle 102, and an interior space 104 of the vehicle 102 that has multiple passengers 106 and 108. The vehicle 102 may be configured to travel across an area 112 (e.g., a road surface), for example, to transport passengers 106 and 108 and/or cargo from a first location to a second location. For the purpose of illustration, the vehicle 102 can comprise an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to stop, including all parking functions, it may be unoccupied. This is merely an example, and the systems and methods described herein may be incorporated into any vehicle, including those ranging from vehicles that are manually controlled (e.g. Level 0 vehicles) to those that are fully autonomous (e.g. Level 5 vehicles) and all forms of partial autonomy between.

The example vehicle 102 shown in FIG. 1 is an automobile having four wheels 114 and respective tires 116 for each of the wheels 114. Other types and configurations of vehicles are contemplated, such as, for example, vans, sport utility vehicles, crossover vehicles, trucks, buses, agricultural vehicles, and construction vehicles. The vehicle 102 may be powered by one or more internal combustion engines, one or more batteries and electric motors, hydrogen fuel cells, or any combination thereof. In addition, although the example vehicle 102 has four wheels, the systems and methods described herein may be incorporated into vehicles having fewer or a greater number of wheels, tires, and/or tracks. The example vehicle 102 has four-wheel steering and may operate generally with equal performance characteristics in all directions, for example, such that a first end 118 of the vehicle 102 is the front end of the vehicle 102 when traveling in a first direction 120, and such that the first end 118 becomes the rear end of the vehicle 102 when traveling in the opposite, second direction 122, as shown in FIG. 1. Similarly, a second end 124 of the vehicle 102 is the front end of the vehicle 102 when traveling in the second direction 122, and such that the second end 124 becomes the rear end of the vehicle 102 when traveling in the opposite, first direction 120. These example characteristics may facilitate greater maneuverability, for example, in small spaces or crowded environments, such as parking lots and urban areas.

The example vehicle 102 shown in FIG. 1 includes one or more doors 126 on each side 128 of the vehicle 102 for facilitating entry and exit of passengers 106 and cargo to and from an interior space 104 of the vehicle 102. The systems and methods described herein may be incorporated into vehicles having fewer or a greater number of doors. The vehicle 102 shown in FIGS. 1 and 2 includes a windshield 130 and a roof 132 extending substantially (e.g., almost entirely) between the first end 118 and second end 124 of the vehicle 102. In some examples, the vehicle 102 may not include a windshield. Because the example vehicle 102 is a Level 5 autonomous vehicle, a windshield is not necessary. In some examples, the vehicle 102 may include a windshield 130, however, regardless of whether the vehicle 102 is configured to be autonomous or manually controlled by a driver. In some examples, at least a portion of the roof 132 may include one more solar cells configured to supply electric energy to the vehicle 102 for powering one or more electrically powered systems of the vehicle 102.

In the example shown in FIG. 1, the system 102 can comprise a pair of sensor arrays 134, which may include, for example, one or more imagers 136, RADAR sensors 138, and/or LIDAR sensors 140 mounted on the vehicle 102. The imagers 136, RADAR sensors 138, and LIDAR sensors 140 of the sensor arrays 134 may be arranged in a predetermined pattern, for example, in order to provide a desired area of coverage of the area 112 proximate the vehicle 102. In some examples, as shown, the imagers 136, RADAR sensors 138, and LIDAR sensors 140 of the sensor arrays 134 can be disposed in a pattern that enables approximately 360-degree coverage around the vehicle 102. This can enable the vehicle 102 to detect objects regardless of which direction 120, 122 the vehicle 102 is traveling. This can also enable the vehicle 102 to detect objects approaching from the sides of the vehicle 102 (e.g., a dog, or other animal, running into the street). Other patterns and arrangements of the imagers 136, RADAR sensors 138, and LIDAR sensors 140 of the sensor arrays 134 are contemplated. Further, though depicted together in FIG. 1 for illustrative purposes, each of the various sensor modalities (i.e. imagers 136, RADAR 138, and LIDAR 140) may be individually placed at various locations about the vehicle 102.

The imagers 136 may be any known types of digital image sensors, digital or analog cameras, and/or digital or analog video cameras. The imagers 136 may be high dynamic range (HDR) cameras, for example, to provide improved accuracy of the images. In some examples, the imagers 136 may include one or more of RGB cameras, intensity cameras, infrared cameras, depth cameras, stereo cameras, or the like. Other suitable types of imagers are contemplated. The imagers 136 may be selected to provide two-dimensional image data, three-dimensional image data, image sequences, gray image data, and/or color image data. In some examples, the imagers 136 may be selected to provide depth data, absorption data, and/or reflectance data.

As shown in FIG. 1, the example sensor arrays 134 may be mounted to a portion of the vehicle 102 that provides a line-of-site view of a portion of the area 112 around the vehicle 102, with at least a portion of the imagers 136, RADAR sensors 138, and LIDAR sensors 140 of the sensor arrays 134 pointed in the direction of travel. As shown, each example sensor array 134 can be mounted to a portion of the roof 132 approaching the upper edge of a windshield 130. The sensor array 134 may be mounted at a location generally corresponding to the upper edge of the windshield 130, for example, either outside or inside the windshield. In examples in which the sensor array 134 is mounted inside the windshield, any distortion of the images resulting from the windshield may be corrected, for example, via lenses or algorithms configured to correct the image data. If the vehicle 102 were to include two windshields due to being bi-directional (like the example vehicle 102), each sensor array 134 could be mounted at a location generally corresponding to the upper edge of the windshield 130.

Although the example sensor arrays 134 shown are mounted to the roof 132, one or more of the sensor arrays 134 could be mounted to other portions of the vehicle 102. For example, one or more of the sensor arrays 134 could be mounted to the first and/or second end of the vehicle 102, for example, at a location generally corresponding to the location of a bumper of a conventional car. According to some examples, sensor arrays 134 may also be mounted to capture images of the area 112 in the paths of each tire 116, or on each side of the vehicle 102.

According to some examples, one or more of the sensor arrays 134 may be mounted in fixed manner, for example, so that images from the sensor array 134 are taken from a constant orientation relative to the remainder of the vehicle 102. In such examples, the images would always be taken from the same angle relative to the vehicle 102 in both the vertical and lateral directions.

According to some examples, one or more of the sensor arrays 134 may be mounted such that the orientation (e.g., aim) of the imagers 136, RADAR sensors 138, and LIDAR sensors 140 of the sensor arrays 134 can be changed relative to the vehicle 102 in the vertical and/or lateral direction. For example, the orientation of the sensor array 134 is may be directed slightly laterally relative to a longitudinal axis X toward the inside of the area 112. Such examples may track the inside of the street of area 112 based on the steering angle of the steering system of the vehicle 102. Such examples may result in the image data obtained by the sensor array 134 being associated with a portion of the area 112 across which the tires 116 of the vehicle 102 travel during a turning maneuver. This may improve the relevance of the image data obtained by the sensor array 134. In some examples, the sensor array 134 may be configured to change orientation relative to the longitudinal axis X, for example, so that the portion of the area 112 to which one or more of the imagers 136, RADAR sensors 138, and LIDAR sensors 140 of the sensor arrays 134 are aimed is either farther ahead or closer to the vehicle 102. In some examples, the sensor array 134 may be configured to rotate in order to change orientation. For example, if the vehicle 102 is traveling at a higher speed, the sensor array 134 may be aimed farther beyond the front of the vehicle 102, so that there is relatively more time for the vehicle 102 to respond to the image data obtained by the sensor array 134. Conversely, if the vehicle 102 is traveling at a relatively slower speed and/or in a densely populated, or otherwise congested area, the sensor array 134 may be aimed closer to the front of the vehicle 102. In some examples, the sensor array 134 can be mounted to permit one or more of these changes in orientation. In such examples, one or more of the imagers 136 may be configured to alter its focal length, for example, to account for changes in distance between the imagers 136 and the portion of the area 112 at which the imagers 136 are aimed.

As discussed above, the autonomous vehicle 102 may detect an event that requires the autonomous vehicle 102 to perform an action. As shown in FIG. 1, the vehicle 102 had a scheduled trajectory 146 to proceed moving forward along the area 112 (e.g., road surface). The vehicle 102 may detect an event while moving along the area, such as an object in the area 112. For example, the sensor array 134 and other components can be used to detect objects in the path of the vehicle 102. In FIG. 1, a soccer ball 142 is shown rolling into the area 112. In this case, the vehicle 102 can detect a soccer ball 142 that may be likely to intersect the trajectory 146 (e.g., with the sensor array 134), which is an example of an event. In some examples, the vehicle 102 may simply determine that the soccer ball 142 will clear the path of the vehicle 102 if the vehicle slightly decelerates. In such an example, the vehicle 102 may simply determine that an action of slightly decelerating (e.g., apply the brakes or reduce the speed) is responsive to the event of the soccer ball 142. However, in some examples, the vehicle 102 can determine, based on the trajectory 146 and position of the vehicle 102 and the trajectory 146 and position of the soccer ball 142, that a collision will occur. Further, the vehicle 102 may assume that a child is chasing the soccer ball 142 and determine an outcome for dealing with the event. For example, the vehicle 102 may determine to avoid the collision with the soccer ball 142 and a potential child chasing the soccer ball 142. The vehicle 102 may include one or more modules to determine alternative actions to take other than the planned trajectory 146, which would result in a collision. For example, the vehicle 102 may determine that an action of a severe deceleration and/or turn will avoid the soccer ball 142. In still other examples, the system can bring the vehicle 102 to a complete stop prior to arriving at the soccer ball 142. Of course, absent evidence of a person proximate the soccer ball 142, for example, the vehicle 102 may choose comfort for the passengers 106 and 108 above the soccer ball 142 and take no action. In other words, running over the soccer ball 142, for example, may be preferable to throwing the passengers 106 and 108 onto the floor of the vehicle 102 absent extenuating circumstances.

In examples where the vehicle 102 determines to take an action of making an evasive behavior to avoid collision, the vehicle 102 may determine a subset of actions (e.g., alternate trajectories or maneuvers) to take which would result in avoiding the collision, and determine a cost associated with each of the subset of actions. The cost of each action may be determined based on various factors, such as the change in magnitude of acceleration (e.g., acceleration, deceleration, etc.), a magnitude of a change in direction, an amount of braking required, or any other factor that may degrade the experience of the passengers 106 and 108. The vehicle may then choose the action of the alternate trajectory or maneuver with the lowest cost and execute that action. In the example of FIG. 1, the determined action 144 comprises braking and swerving to the left of the soccer ball 142.

To build trust with the passengers 106 and 108, the vehicle 102 may output an indication of the event of detecting a collision with the soccer ball 142 and the action 144 that was used to achieve the outcome of avoiding the collision. As shown in FIG. 1, the interior space 104 includes the passengers 106 and 108. The interior space 104 further includes output devices 148, such as speakers. The vehicle 102 may use the output devices 148 to provide the passengers 106 and 108 with feedback regarding the event and the action 144 taken by the vehicle 102. In the example illustrated in FIG. 1, the output devices 148 may provide sound output 150 including words 152 explaining that "the car decelerated and swerved left to avoid an object in the road." In this way, the passengers 106 and 108 may be apprised of the reasoning for the vehicle 102 swerving to the left. In various examples, the sound output 150 may be provided prior to the vehicle 102 performing the determined action 144. However, if there is insufficient time to warn the passengers 106 and 108 before performing the determined action 144, the sound output 150 may be provided after performing the maneuver using the determined action 144. In other examples, various other types of output may be provided by the vehicle 102 to the passengers 106 and 108, as described in more detail below.

Figure 2:
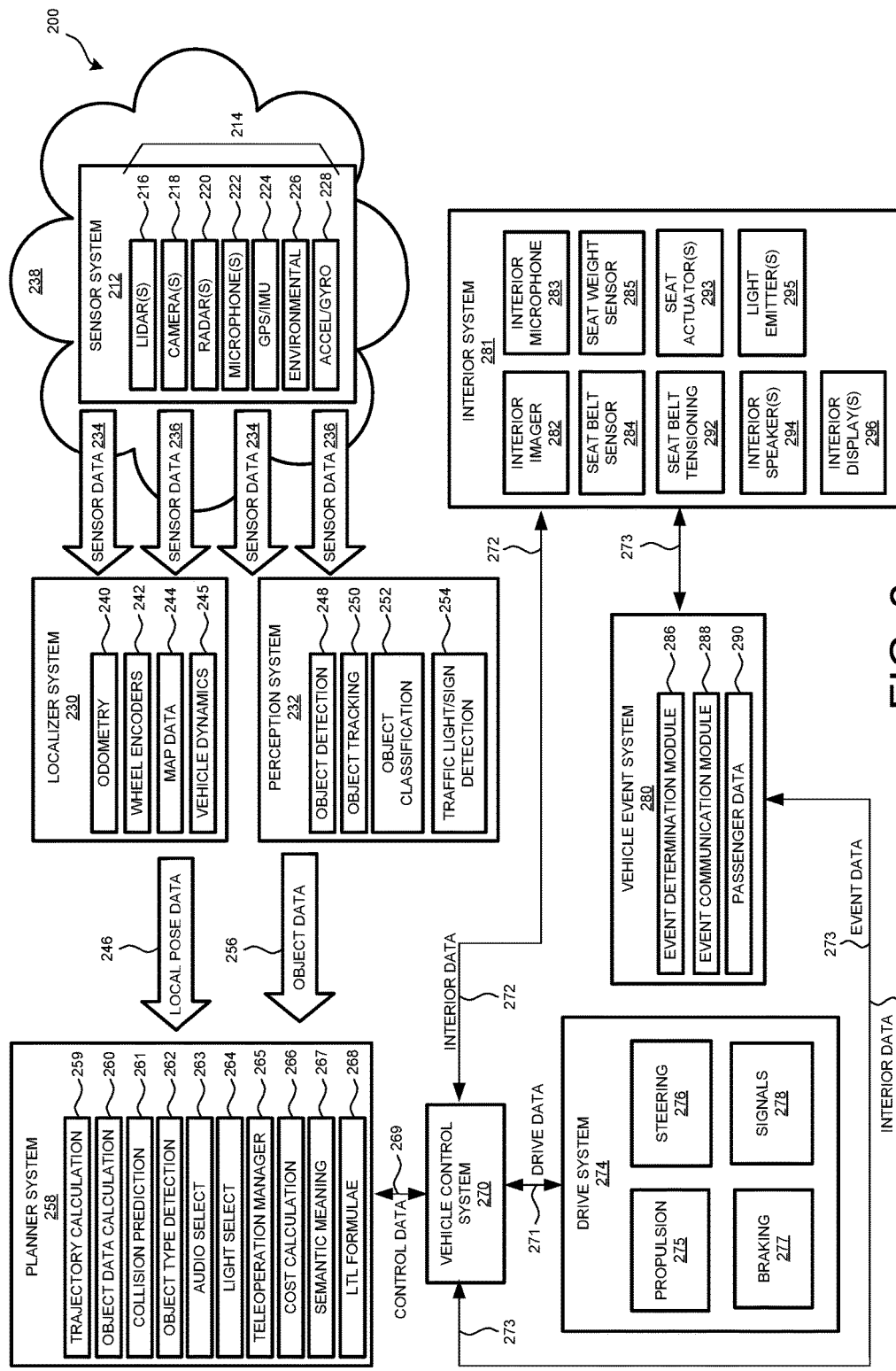
FIG. 2 is a block diagram of an example operational control system for controlling an autonomous vehicle.

FIG. 2 is a block diagram of an example operational control system 200 for controlling an autonomous vehicle, such as the vehicle 102. In various implementations, the operation control system 200 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, Graphics Processing Unit(s), Central Processing Unit(s), Performance Optimization With Enhanced RISC—Performance Computing (PowerPC), Scalable Processor Architecture (SPARC), or Microprocessor without Interlocked Pipeline Stages (MIPS) instruction set architecture (ISA)s, or any other suitable ISA. In multiprocessor systems, each processor may commonly, but not necessarily, implement the same ISA.

The operation control system 200 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic random access memory (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent or stored on different types of computer-accessible media, such as non-transitory media, or on similar media separate from the non-transitory computer readable media. Generally speaking, a non-transitory, computer readable memory may include storage media or memory media, such as flash memory (e.g., solid-state memory), magnetic or optical media (e.g., a disk) coupled to the operation control system 200 via an input/output (I/O) interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In one implementation, the I/O interface may be configured to coordinate I/O traffic between the processor(s), the non-transitory computer readable media, and any peripheral devices, the network interface or other peripheral interfaces, such as input/output devices. In some implementations, the I/O interface may perform any necessary protocol, timing or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example shown in FIG. 2, the operation control system 200 includes a sensor system 212 including a plurality of sensors 214. The sensors 214 may include, for example, LIDAR 216, image capture sensors 218 (e.g., cameras or other imagers), RADAR 220, sound capture sensors 222 (e.g., microphones), global positioning system (GPS) sensors and/or inertial measurement unit sensors (IMU) 224. The sensor system 212 may also include one or more environmental sensors 226, such as, for example, one or more sensors for detecting ambient temperature, temperature of the road surface, humidity, and barometric pressure. The sensor system 212 can also include an accelerometer/gyroscope 228 to measure the orientation and/or acceleration of the vehicle 102. As discussed below, these sensors 214 can be used to detect events in the environment 238 of the vehicle 102 for which actions must be determined to achieve an outcome responsive to the event.

The operation control system 200 may also include a localizer system 230 and a perception system 232 that may receive location and environment sensor data 234 and/or object sensor data 236, respectively, from one or more of the sensors 214 of the sensor system 212. For example, the localizer system 230 may receive location and environment sensor data 234 associated with the location of the vehicle 102 in the environment 238, such as from GPS/IMU 224, LIDAR(s) 216, image capture sensors 218, etc. The perception system 232 may receive object sensor data 236 relevant to determine information associated with objects in the environment 238 surrounding the vehicle 102, such as sensor data from LIDAR 216, image capture sensors 218, RADAR 220, environmental sensors 226, and/or sound capture sensors 222. In some examples, the localizer system 230 may receive data from sources other than the sensor system 212, such as, for example, map data, map tile data, route data, route network definition file (RNDF) data, a data store, and/or a data repository. In some examples, the location and environment sensor data 234 received by the localizer system 230 may be identical (or at least similar) to the object sensor data 236 received by the perception system 232. In some examples, the sensor data 234, 236 received by the localizer system 230 may not be identical to the sensor data 234, 236 received by the perception system 232. The sensor data 234, 236 may each include data from any combination of one or more sensors or sensor types in the sensor system 212. The amounts and types of sensor data 234, 236 may be independent from one another and/or may be similar or equivalent.

The localizer system 230 may receive and/or access data from sources other than sensor data 234, 236, such as, for example, odometer data 240 from motion sensors configured to estimate a change in position of the vehicle 102 over time, wheel encoders 242 configured to calculate motion, distance, and other metrics associated with the vehicle 102 based on the rotations of one or more of the wheels 114, map data 244 from data representing map tiles, route data, RNDF data, and/or other data, and data representing the model and/or type of vehicle corresponding to the vehicle 102, which may be used to calculate vehicle location data based on vehicle dynamics modeling 245 (e.g., from simulations, captured data, etc.) of the vehicle 102. The localizer system 230 may use one or more of the data resources indicated herein to generate data representing local position and orientation data (e.g., local pose data 246).

In some examples, the perception system 232 may analyze, process, and/or manipulate sensor data 234, 236 to implement object detection 248 and/or an object tracking 250. This can include differentiating between objects that are static and objects that dynamic. The object tracking 250 can also track one or more moving objects based on the movement of the object in the environment 238. In some examples, the perception system 232 may include object classification 252 to identify the object type—e.g., car, motorcycle, cyclist, pedestrian, empty box, trash, etc. The perception system 232 can also include a traffic light/sign detection 254 strategy (e.g., identifying traffic lights, stop signs, railroad crossings, lane markers, and pedestrian crosswalks).

In various examples, the object classification 252 may include one or more machine learning algorithms configured to determine a semantic classification and/or identification of objects captured in the sensor data 236 and/or 234. For example, the machine learning algorithms (e.g., neural network, decision trees, linear regression, etc.) may be configured to predict a segmented image from an input image of the sensor data 234 and/or 236. In some examples, the machine learning algorithms may comprise convolution neural networks (CNNs) which pass input data through a series of connected layers to provide an output. Each layer in a CNN architecture creates some association of information, such as segmentation of images performed through the use of both spatial layers, as well as temporal layers. In some instances, the CNNs can perform semantic segmentation to segment images and provide classification and/or identification of objects associated with the segmented portions of the image. For example, the convolution layers in the CNNs have parameters that are learned so that filters are adjusted automatically to extract the most useful information for the task at hand. For example, in a general object recognition task it might be most useful to filter information about the shape of an object (e.g., recognizing a car model may be based on a shape of the car).

The CNNs may be trained to learn the various parameters for object recognition. Training is accomplished by inputting a dataset into the CNN, the dataset being associated with expected output values. These expected output values may generally be referred to as "ground truth." For example, a ground truth may include an identification of specific objects in an image, as well as a semantic classification or label of the object (e.g., identifying and labeling an object as a car or a building). In some instances, datasets can include one or more images representing real-world scenes and may be annotated by hand or via one or more algorithms to segment, detect, classify, and/or label objects in the dataset. In some instances, a dataset can include synthetic (e.g., computer generated) data that has been annotated by a computer algorithm. Training can be performed using offline and/or online data.

In this way, machine learning algorithms of the object classification 252 may be trained to receive image data in the sensor data 234 and/or 236, and determine semantic labels or classifications for objects detected in the image data.

In the example shown, the operation control system 200 also includes a planner system 258 configured to receive the local pose data 246 and object data 256, and analyze the local pose data 246 and the object data 256 to implement functions including, for example, a trajectory calculation module 259, an object data calculation module 260, a collision prediction module 261, an object type detection module 262, an audio signal selection module 263, and a light pattern selection module 264. In some examples, the planner system 258 further comprises a teleoperation manager module 265, a cost calculation module 266, a semantic meaning module 267, and Linear Temporal Logic Formulae module 268. The planner system 258 may perform an action (e.g. perform a trajectory change, perform an evasive maneuver, control various systems and subsystems of the vehicle 102, and the like) based at least in part on any one or more of the modules.

The trajectory calculation module 259 may determine a plurality of trajectories substantially simultaneously, each of which may guide the vehicle 102 at least a portion of the way along a route towards a destination. The plurality of trajectories may be calculated at a given frequency, e.g. 10-200 Hz. In some examples, such trajectories may be determined in accordance with a receding horizon technique. In such an example, each trajectory may only span a fixed time into the future, e.g. 2 ms to 10 s. As new trajectories may be calculated more frequently than the span of the trajectory (e.g. calculated every 10 Hz with a 200 ms horizon), it is possible to compare a previously selected trajectory with a currently calculated trajectory. The plurality of trajectories generated may be determined based at least in part on route data (including a destination), local pose data 246, object data 256, etc. In some examples, each trajectory generated by the trajectory calculation module 259 may have an associated confidence level, the confidence level indicating a probability that the associated trajectory may be traversed successfully (e.g. safely and/or comfortably). Such confidence levels may, for example, be based at least in part on a pose of the vehicle 102 in the environment, relative locations of obstacles and their associated tracks (e.g. stored positions over time), and probabilities of impact, as may be determined from either the pose data 246 and/or the object data 256 in addition to the collision prediction module 261.

The object data calculation module 260 may perform various operations on the object data 256, local pose data 246, and/or sensor data 234, 236. Such operations may include, but are not limited to, determining relative positions of objects in an environment, determining qualities of the objects, and the like. Output of the object data calculation module 260 may be used by any one or more of the other modules of the planner system 258. Similarly, object type detection module 262 may receive one or more of object data 256, local pose data 246, or output from object data calculation module 260 to refine classifications provided by object data 256 or reclassify objects. An output of the object type detection module 262 may be used by any one or more of the planner system modules 258. As a non-limiting example, output from one or more of the object data calculation module 260 or the object type detection module 262 may reclassify an object originally detected as children crossing a road as a street sign indicating a school zone. Such a reclassification may alter trajectories determined by trajectory calculation module 259.

Based at least in part on one or more of the modules within the planner system 258, various trajectories determined by the trajectory calculation module 259 may be evaluated for use in controlling the vehicle 102. For example, each proposed trajectory may be evaluated by an LTL Formula module 268 (as will be described in further detail below). In such an example, any trajectory which violates a relevant LTL formula (i.e. evaluates to false) may be discarded. Alternatively, or additionally, such formulae may be used to evaluate a previously selected trajectory. Due to changes in an environment, a previous trajectory which had originally satisfied an LTL formula (e.g. evaluated to true), may now violate the same formula. For example, consider the situation in which an animal runs into the path of the vehicle 102. In such an example, the previously selected trajectory would violate the LTL formula requiring a trajectory to be free of obstacles. Multiple previous trajectories may be stored by the planner system 258 so that they may be compared with a currently determined trajectory.

The planner system 258 may then select the trajectory of the plurality of trajectories having the highest confidence level which satisfies all relevant LTL formula and has the lowest cost, as will be discussed in further detail below.

In various examples, the planner system 258 of the vehicle 102 may experience an event. Generally, an event may be any change in state of the world, the system, and/or the environment. As one example, an event may be an obstacle blocking the vehicle such that no trajectory generated has an associated confidence level above some threshold confidence. In such an example, the planner system 258 may employ the teleoperation manager 265 to send a message to a teleoperation service remote from the vehicle 102. Here, the planner system 258 may detect an object obscuring the path of the vehicle 102 and, further, that the object type detection 262 is unable to determine a type of the object. As another example, the planner system 258 may be unable to determine a trajectory calculation 259 over which the vehicle 102 may safely transit with a relatively high degree of confidence or certainty. In such examples, the teleoperation manager 265 may transmit a message to the teleoperation service requesting help in determining a trajectory calculation 259 for the event. The message may include various types of data, such as sensor data 234/236, as well as local pose data 246 and object data 256. The teleoperation service may respond to the teleoperation manager 265 with an action for the vehicle 102 to take to safely navigate the event. In such examples, the vehicle 102 may simply pull over to the side of the road and idle while waiting for a response.

In some examples, the planner system 258 may comprise a Linear Temporal Logic (LTL) Formulae module 268 which may comprise a dataset of one or more LTL formulae, each formula associated with various symbols and/or predicates. Though illustrated in FIG. 2 as a Linear Temporal Logic Formulae Module 268 for illustrative purposes, any form of temporal logic may be employed without limitation, such as, for example, signal temporal logic. Each LTL formula may inform the planner system 258 of some aspect of the vehicle interacting with the environment, or objects disposed within the environment. As non-limiting examples, various LTL formula may comprise symbols and/or predicates organized in such a way as to inform the vehicle 102 of safe and/or comfortable operation. An example LTL formula would evaluate to true if the vehicle 102 would collide with anything in the next 10 seconds. Such an LTL Formulae module 268 may associate object data 256 (e.g. object classifications, sizes, states, etc.) with various symbols and/or predicates. In some examples, these associations may be performed in a semantic meaning module 267, as will be discussed in detail below. Based on the detected symbols and/or predicates, the LTL Formulae module 268 may determine relevant LTL formulae to evaluate. For example, where a symbol of a stop sign is not detected, none of the formulae comprising a stop sign may be evaluated.

In various examples, at any instant in time, one or more LTL Formulae Module (e.g., models) 268 may be relevant for the vehicle 102 based on sensor data 234, 236, the local pose data 246 and the object data 256. For instance, once the modules have determined a vehicle state (e.g., geographic position, speed, movement direction, etc.) and detected objects in an environment (e.g., intersection, other vehicles, signs, etc.), the objects, object states, autonomous vehicle, autonomous vehicle state, may be associated with or mapped to symbols and/or predicts. As above, only those LTL Formulae Module 268 which contain such symbols and/or predicates may then be considered relevant to the instantaneous scenario.

The LTL Formulae Module 268 may also comprise various templates. Each LTL formula may be associated with one or more corresponding templates for each event and/or action determined for the vehicle 102, where the template indicates a method (e.g., visual, haptic, natural language audio, etc.) for notifying the passenger of the event and/or action. The templates may capture or represent the semantic meaning of the formula in a human-understandable way, and represent the reason behind the action being taken by the planner system 258 and the method by which to output the reason and action to the passenger in various forms.

Once the objects, object states, autonomous vehicle, and autonomous vehicle state are mapped or associated to the relevant LTL formulae (e.g. by associating objects and their respective data with symbols and/or predicates), the formulae may be evaluated (e.g., "true" or "false"), and an action is performed by the autonomous vehicle based on whether the criteria is met. Several examples of formulae in the LTL Formulae Module 268 are provided below. In one example, a detected, potential collision between the vehicle 102 and an object causes the planner system 258 to determine a new trajectory for the vehicle 102. In some examples, an entry stored in the LTL Formulae Module 268 may look like the description shown below in Table 1.

TABLE 1

| LTL Formula/Rule | LTL Evaluation | Action/Response/ Sentence Syntax |
| --- | --- | --- |
| VehicleAndOther-CarTimingsOverlap IMPLIES ((NOT VehileInIntersection) UNTIL (NOT VehicleAndOther-CarTimingsOverlap)) | VehicleAnd-OtherCar-Timings-Overlap is true | Flash Lights; Communicate to Passenger: "Changing trajectory because we would collide with the car on our left" |

As shown in Table 1, an LTL formula/rule is determined for the detected, potential collision which represents the scenario. The LTL formula/rule shown in Table 1 is determined based on the objects, object states, autonomous vehicle, and autonomous vehicle state determined by the modules of the planner system 258. Once a relevant LTL formula or rule is determined, the LTL formula or rule may be evaluated (e.g., "true" or "false"). As shown in Table 1, the evaluation is "true" which indicates that the vehicle and other car timings do overlap, and a collision will occur. Each formula may have an associated Action, Response, and/or Sentence Syntax. An action may be some control or sequence of controls to be performed by the vehicle 102, e.g. control the vehicle to follow an alternate trajectory. A response may include a mechanism to convey information to one or more passengers. In the example illustrated in table 1, such a control may be "Flash Lights" and "Communicate to Passenger," which cause the vehicle 102 to flash internal lights and play an audio signal to the passengers. An associated human understandable Sentence Syntax may be "changing trajectory because we would collide with the car on our left." Such a Sentence Syntax may be verbally communicated to the passengers. In this way, the semantic meaning behind the action and event may be communicated to the passenger of the vehicle so that the passenger understands why the vehicle 102 performed the action. In some examples, if the evaluation is determined to be "false," a passenger may not be notified because there is no action to be taken.

As another example, the planner system 258 may experience an event that it is unable to navigate (e.g. no trajectory may have a confidence level above a threshold level) and employ the teleoperation manager 265 to send a message to the teleoperation service remote from the vehicle 102. More specifically, the planner system 258 may detect an object obscuring a path of the vehicle 102 for which the object type detection 262 is unable to determine a type of the object. In such examples, the teleoperation manager 265 may transmit a message to the teleoperation service requesting help in determining a trajectory calculation 259 for the particular event. In such examples, an entry stored in the LTL Formulae Module 268 may look like the description shown below in Table 2.

TABLE 2

| LTL Formula/Rule | LTL Evaluation | Action/Response/Sentence Syntax |
| --- | --- | --- |
| (VehicleStopped AND ObjectBlockingVehicle AND ObjectPredictedStationary) IMPLIES CallTeleOp | (VehicleStopped AND ObjectBlockingHero AND ObjectPredictedStationary) is true | Communicate: "There was an object in the road. Alternate procedures required" |

As shown in Table 2, the objects and object states of "vehicle" and "object" are mapped to symbols and/or predicates. Such symbols and/or predicates may be determined using the local pose data 246 and/or object data 256. Such symbols and/or predicates may, in turn, be associated with one or more LTL formulae. In this case, one such relevant LTL formula/rule is selected as relevant and evaluated when the vehicle 102 is stopped. The LTL formula/rule states that if the vehicle 102 is stopped, there is an object blocking the vehicle, and the object is stationary, it is implied that the teleoperation manager 265 is contacting the teleoperation service. Once the planner system 258 evaluates the LTL formula/rule, the LTL evaluation shows that "VehicleStopped AND ObjectBlockingVehicle AND ObjectPredictedStationary" is "true." Because the evaluation returns "true," that means the vehicle is stopped, an object is blocking the vehicle, and the object is predicted as stationary. Thus, the teleoperation manager 265 may be used to call a teleoperator for help navigating the situation. The action determined when "true" is to call a teleoperator. The evaluation is to notify the user by communicating "there was an object in the road. Alternate procedures required." In various examples, the actions/responses are hardcoded in the LTL formula/rules of the LTL Formulae Module 268. Thus, the objects, object states, autonomous vehicle, and autonomous vehicle state are mapped to symbols connected by the appropriate predicates.

In some examples, the LTL Formulae Module 268 comprise additional formulae which do not correspond to operation of the vehicle 102, per se. In some examples, such formulae may be used to inform passengers of their environment, such as, for example, formula which specify proximity to geographic locations (e.g. restaurants, destinations, entertainment venue, etc.), charge state or fuel state of the vehicle, proximity to other travelers, and the like. As a non-limiting example, consider an LTL formula which evaluates to true when the vehicle 102 is within 100 meters of a particular restaurant (e.g. McDonald's). In such an example, the satisfaction (i.e. evaluation of the formula resulting in "true") may result in communicating with the passengers, as may be described by any example herein.

In some examples, the semantic meaning module 267 determine a semantic meaning (or semantic context) for the event and/or the action. For instance, the event determination module 267 may analyze the event data, such as sensor data 234, sensor data 236, local pose data 246, object data 256, trajectory calculation 259, object data calculation 260, collision prediction 261, object type detection 262, control data 269, semantic classification data, and/or interior data 272, to determine the event and/or action. Additionally, or alternatively, the semantic meaning module 267 may identify the semantic meaning by observing the action/response/sentence syntax included in the LTL Formulae Module 268 determined based on the mapping of the objects, object states, autonomous vehicle, and autonomous vehicle state to the predicates and symbols. In some examples, the semantic meaning module 267 may aid in associating various objects and object states with various symbols and/or predicates.

In various examples, the cost calculation module 266 may determine a cost associated with the determined action based on various factors. The factors used to determine the cost may generally represent results caused by an action taken by the vehicle 102 that may negatively impact the passenger and/or the vehicle 102, such as a large magnitude of "jerk" due to rapid acceleration or deceleration of the autonomous vehicle, route changes, changes in the distance of a new route, changes in the time to traverse a new route, changes in battery life consumed due to a new route, an amount of turns added in a new route, etc. The cost calculation module 266 may determine a total cost for the action based on a number of the factors associated with the action and/or the severity of a factor associated with the action (e.g., a high change in acceleration is a higher cost action compared to a low change in acceleration). For instance, if the vehicle 102 must swerve to avoid the soccer ball 142 to avoid collision, that may be a relatively high cost due to the high amount of acceleration or deceleration as well as the change in direction associated with a swerving trajectory. Conversely, applying the brakes slightly earlier to provide additional room between a lead vehicle and the vehicle 102 at a stop light may be an action having a relatively low cost.

The example planner system 258 may communicate the selected action as control data 269 to a vehicle control system 270. Such control data 269 may comprise one or more audio signals as indicated by the Action/Response/Sentence Syntax of LTL Formulae module 268 and selected by the audio selection module 263. Additionally, or in the alternative, such control data 269 may comprise one or more light signals as indicated by the Action/Response/Sentence Syntax of LTL Formulae module 268 and selected by the light pattern selection module 264. In some examples, the audio selector module 263 and/or the light pattern selector module 264 may comprise a data store of audio files, light patterns, images, videos, and the like. The vehicle control system 270 may be configured to process the control data 269 to generate drive system data 271, interior system data 272, and event system data 273. The drive system data 271 may be communicated to a drive system 274, and the drive system 274 may be configured to communicate the drive system data 271 to a propulsion system 275, a steering system 276, a braking system 277, and a signal system 278 (e.g., turn signals, brake signals, headlights, and/or running lights). For example, the drive system data 271 may include propulsion data (e.g., a voltage, current, or power signal for electric motors, and/or a throttle signal for internal combustion engines) for the propulsion system 275, steering angle data for the steering system 276 (e.g., a steering angle setting), and braking data for the braking system 277 (e.g., a deceleration rate to be achieved).

The operation control system 200 of the vehicle 102 may further include a vehicle event system 280 and an interior system 281. The interior system 281 may include systems, such as, for example, one or more interior imagers 282, one or more interior microphones 283, one or more seat belt sensors 284, and one or more seat weight sensors 285. These components can be used to detect and/or collect data regarding passengers 106 and 108 in the vehicle 102.

The seat belt sensors 284 can be a simple switch or sensor to detect when the seat belt has been fastened around passengers 106 and 108 and/or cargo. As the name implies, the seat weight sensors 285 can detect the weight of an object in the seat. In some examples, the seat weight sensors 285 can be a simple weight sensitive switch with a threshold weight. In this configuration, the seat weight sensors 285 may supply a signal indicating whether or not a weight above a threshold weight (e.g., 70 lbs.) is in the seat. In other examples, the seat weight sensors 285 can comprise a strain gauge, or other weight sensor, capable of determining the actual weight of the object or passenger in the seat. These sensors 284 and 285 may provide data to the vehicle event system to notify the system that a passenger is in a seat.

The interior imagers 282 may be any known types of digital image sensors, digital or analog cameras, and/or digital or analog video cameras. The interior imagers 282 may be high dynamic range (HDR) cameras, for example, to provide improved accuracy of the images. In some examples, the interior imagers 282 may include one or more of light-sensitive cameras, range sensors, tomography devices, RADAR, and/or ultra-sonic cameras. Other suitable types of imagers are contemplated. The interior imagers 282 may be selected to provide two-dimensional image data, three-dimensional image data, image sequences, gray image data, and/or color image data. In some examples, the interior imagers 282 may be selected to provide depth data, absorption data, and/or reflectance data. In some examples, the interior imagers 282 may be configured to detect facial expressions of passengers 106 and 108 which indicate emotional response caused by actions taken by the vehicle 102. As a non-limiting example, such emotional responses may be determined by, for instance, inputting data from interior imagers 292 into a neural network trained to recognize facial expressions.

The interior imagers 282 can be aimed at the interior space 104 of the vehicle 102, for example, to provide the vehicle event system with passenger data. So, for example, if the seat belt sensors 284 indicates the seat belt is buckled and that the seat weight sensors 285 indicate 135 lbs., it is likely that a passenger is in the vehicle 102. This can be further confirmed using image data from the interior imagers 282 and image recognition software capable of identifying a human being. These inputs 282, 284, and 285 can enable the vehicle event system 280 and other vehicle systems (e.g., operation control system 200 or vehicle control system 270) to distinguish between a 130 lb. box, for example, and a 130 lb. passenger and adjust maneuvering limits as necessary.

The interior system 281 may further include interior microphones 283 to capture sounds in the interior space 104 of the vehicle 102. The interior microphones 283 may capture sounds or words that come from the passenger 106 of the vehicle 102. In some examples, the interior microphones 283 may send audio signals representing the sound captured to the vehicle event system 280. In such an example, the vehicle event system 280 may perform natural language processing to determine what, if anything, the passenger 106 said.

In some examples, the vehicle event system 280 may include modules and/or data to determine whether to communicate indications of the events and actions taken by the vehicle to the passenger 106. The vehicle event system 280 may receive event data 273 from the planner system. The event data 273 may comprise any type of data, such as sensor data 234, sensor data 236, local pose data 246, object data 256, trajectory calculation 259, object data calculation 260, collision prediction 261, object type detection 262, LTL Formulae Module 268, control data 269, semantic classification data, and/or interior data 272. In some examples, an event determination module 286 may determine an event that has occurred with the vehicle 102 based at least in part on the LTL Formulae Module 268 determined by the planner system 258. In some examples, such an event determination module 286 may reside in the planner system 258. In such an example, event data 273 may comprise data as determined by the event determination module 286. The event determination module 286 may use the various types of data and/or the LTL Formulae Module 268 to determine the event that has occurred. For example, the event determination module 286 may use the object type detection 262 to determine an object type involved in the event as well as a semantic classification for the object type based at least in part on the LTL Formulae Module 268, the collision prediction 261 to determine that a collision is likely to occur, the trajectory calculation 259 and/or the LTL Formulae Module 268 to determine an action (e.g., trajectory and/or maneuver) determined by the planner system 258 to avoid the collision. Using this data, such as the LTL Formulae Module 268, the event determination module 286 may determine, for example, that a collision between the vehicle 102 and the soccer ball 142 was avoided by performing a maneuver using the determined action 144. Thus, the event determination module 286 may determine a description of the event and the action, such as by identifying the action/response/sentence syntax in the LTL Formulae Module 268. In some examples, the event determination module 286 may use the method of communication provided in the LTL Formulae Module 268 data to determine a description of the event and how to notify the passenger of the event and action.

In some examples, based on determining a cost for the action by the cost calculation module 266, the event communication module 288 may determine whether or not to communicate the event and action to the passenger 106. Generally, the determination of whether to notify the passenger 106 of the event and any correlating action will be based on the relative cost of the action with respect to the original action to traverse the planned route. For example, if the action of the originally planned route was to simply keep driving straight along a road, and the determined action is to change the trajectory to avoid a collision with the soccer ball 142, the relative cost of the determined action may be relatively high compared to driving on a straight road and merit notifying the passenger 106. Alternatively, if the determined action is simply to start braking earlier than planned at a stop light to provide additional room between the autonomous vehicle and a lead vehicle, the cost of braking slightly earlier may be only slightly higher than the cost of braking on the originally planned route and does not merit notifying the user. In various examples, the event and action may be reported to a passenger 106 when the relative cost of the determined action compared to the original action or plan is higher than a threshold cost difference. In some examples, the threshold cost difference may be a static amount, while in other examples the threshold cost difference may be dynamic. For instance, the event communication module 288 may employ passenger data 290 to dynamically define the threshold cost difference. In some examples, based on the familiarity of the passenger 106 with autonomous vehicles (e.g., the passenger has ridden in an autonomous vehicle many times), the threshold cost difference may be raised, resulting in less events and actions being reported to an experience passenger 106. Other factors may be considered for determining the threshold cost difference, such as the age of a passenger, emotional recognition for a passenger (e.g., facial recognition provided by the interior images 282, audible sound detected by the interior microphones, etc.), or various types of demographic information for a passenger 106.

In various instances, the event communication module 288 may always report the events and actions to the passenger 106. For example, if an event and associated action are not reported to a passenger 106, but audio signal provided from the interior microphones 283 indicates that the passenger 106 subsequently asks "what just happened" (e.g., explicit request), the event communication module 288 will determine to notify the passenger 106 of the event and the action. As another example, various actions performed by the vehicle 102 that would not be performed by a human driver may always reported to a passenger. For example, the event communication module 288 may always notify the passenger 106 of the actions determined using the teleoperation services as the vehicle will pull over to the side of the road and idle while waiting for the action. The event communication module 288 may determine that the passenger 106 would like to always be apprised of what is occurring as pulling over and idling without any explanation is not an event that a human driver would not do without explanation.

Upon determining to communicate the event and action to the passenger, the event communication module 288 of the autonomous vehicle may determine to use one or more methods for notifying the passenger 106. For example, the event communication module 288 may use audio notifications (e.g., voice informing the user of what is happening, a chime or sound indicating an event is occurring, etc.), visual notifications, (e.g., lights interior the autonomous vehicle flashing, text presented on a display of the vehicle explaining the event and action, video illustrating an example scene of the event and action, etc.), and/or haptic notifications (e.g., vibrations in a seat, tugging on a seatbelt, tightening of a seatbelt, etc.). in some examples, the event communication module 288 may determine which method to use to notify the passenger 106 based at least in part on the LTL Formulae Module 268. For instance, the template associated with the selected LTL model may define which method to use to notify the passenger 106 of the event and action. For instance, a relevant LTL formula from the LTL Formulae Module 268 may indicate that the event communication module 288 is to flash lights and audibly communicate to the passenger "the vehicle is changing trajectory because we would collide with the car on the left." As described above, each of these templates may be stored in the LTL Formulae Module 268 in the vehicle 102 and be hardcoded, or otherwise associated, with the respective LTL Formulae Module 268 determined in the planner system 258 for the particular event and action/response.

The interior system 281 may include systems, such as, for example, a seat belt tensioning system 292, a seat actuator system 293, one or more interior speakers 294, one or more light emitters 295 and one or more interior displays 299. In some examples, the seat actuator system 293 and the seat belt tensioning system 292 may be mounted at one or more locations associated with the interior space 104 of the vehicle 102, and may be coupled to, for example, a seat, the floor, a support rail, a support bracket, a support pillar, or other structures. In some examples, the seat actuator system 293 may be configured to move a seat from a first position to a second position using energy from, for example, the impact force of a collision, and may apply a counteracting force to the seat to control the acceleration of the seat. In some examples, the counteracting force may be provided by a spring and/or damper of the seat actuator system 293. In various examples, the seat actuator system 293 may further provide haptic feedback to a passenger 106, such as by vibrating the seat indicating that the vehicle is about to perform an action for an event. For example, the seat actuator system 293 may receive data from the event communication module 288 indicating that the seat actuator system 293 is to vibrate the seat of the passenger to indicate an action is to be performed.

In some examples, the seat belt tensioning system 292 may be configured to retract a seat belt deployed about a passenger 106 to pre-tension or tighten it about the passenger 106 prior to a collision predicted by the planner system 258. In some examples, the seat belt tensioning system 292 may further be configured to receive data from the event communication module 288 indicating that seat belt tensioning system 292 is to tighten a seatbelt of the passenger 106 to provide haptic feedback that an action is about to be performed for an event.

In some examples, the interior speakers 294, light emitters 295, and interior displays 296 may additionally receive data or instructions from the event communication module 288. Such data or instructions may have been previously provided from one or more of the audio selector module 263 or the light pattern selector module 264, as described above. The interior speakers 294 may receive data to output audio feedback to the passenger 106. For instance, the interior speakers 294 may output an alert, such as a chime, indicating an action is going to be performed for an event. Additionally, or alternatively, the interior speakers 294 may output words or phrases information the passenger 106 of the event and/or the action that is to be performed or was performed by the vehicle 102. The interior displays 296 may present text that describes the event and/or action to the passenger 106. Additionally, or alternatively, the interior displays 296 may present a picture or video of the event and/or action, or a graphical representation of the event and/or action to the passenger 106. In some instances, the interior displays 296 may be part of the vehicle 102, while in other examples, the interior displays 296 may be a device associated with the user. For example, an application on the device associated with the user may present the text or images describing the event and/or action. The light emitters 295 may be configured to change the ambient light of the interior space 104 of the vehicle 102. For instance, the light emitters 295 may turn on and off the lights, or change the color of the lights, to indicate events and/or actions performed by the vehicle 102.

Figure 3:
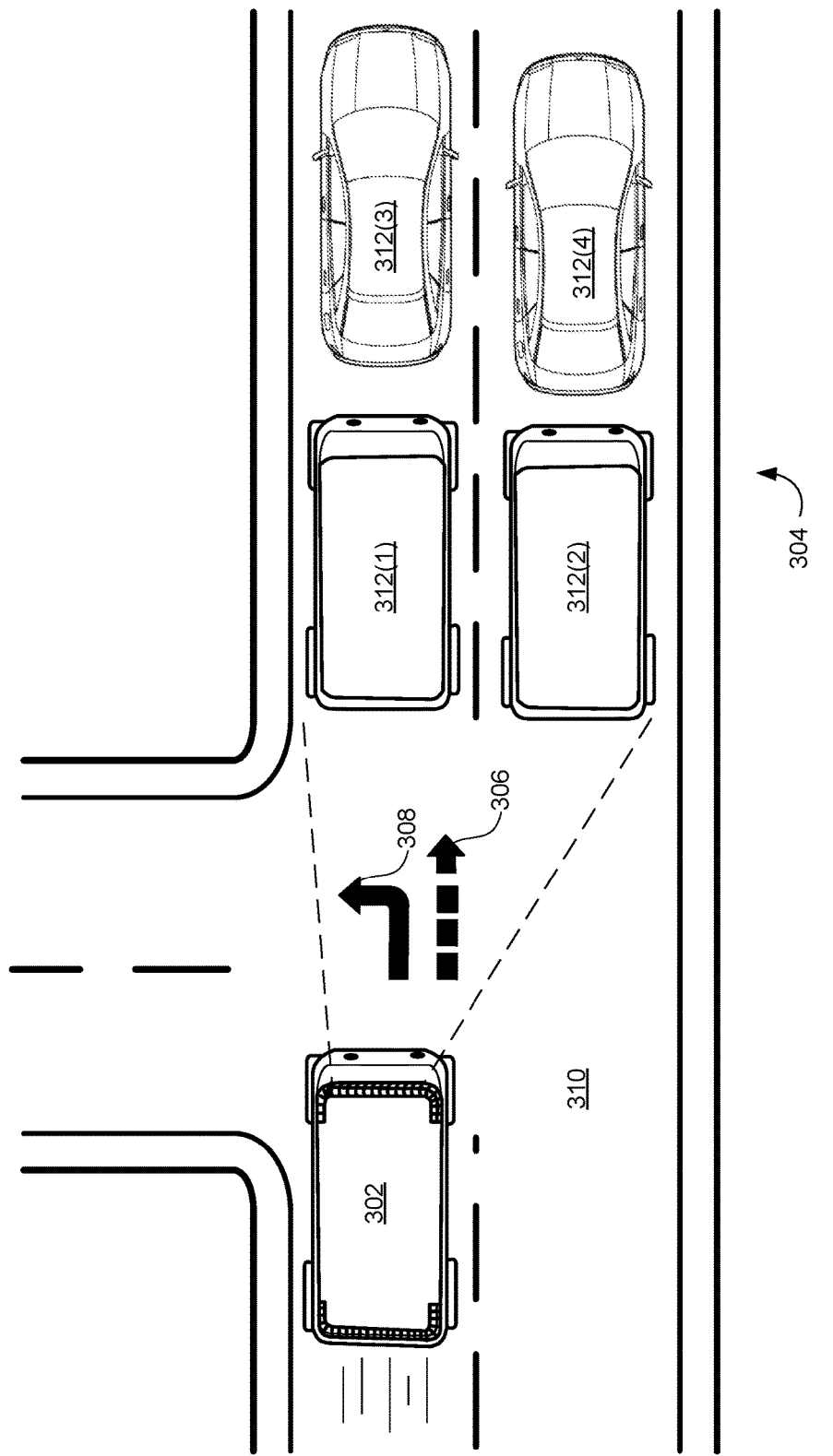
FIG. 3 illustrates an example environment including an autonomous vehicle detecting a traffic event and determining to change the originally planned route by determining an action responsive to the traffic event.

FIG. 3 illustrates an example environment 300 including an autonomous vehicle 302 which detects a traffic event 304. Based at least in part on detecting the traffic event 304, a planner system, such as planner system 258, may alter the originally planned route by changing an original trajectory 306 to an altered trajectory 308.

As shown, the autonomous vehicle 302 (e.g., vehicle 102) may be traveling along a street 310 and detect the traffic event 304. The traffic event may be detected using various sensors (e.g., sensor arrays 134) which capture images or other data representing vehicles 312 (e.g., 312(1), 312(2), 312(3), 312(4)) stopped due to the traffic event 304. Various modules of the autonomous vehicle (e.g., planner system 258, vehicle event system 280, etc.) may determine an action to perform in response to the traffic event 304. For example, one or more of the modules may determine the action to perform comprises one or more of performing a maneuver or deviating from an original trajectory 306 to an alternate trajectory 308. As illustrated in FIG. 3, in response to the traffic event 304 the modules of the autonomous vehicle 302 caused the vehicle to turn left onto another street to bypass the traffic event 304.

Figure 4:
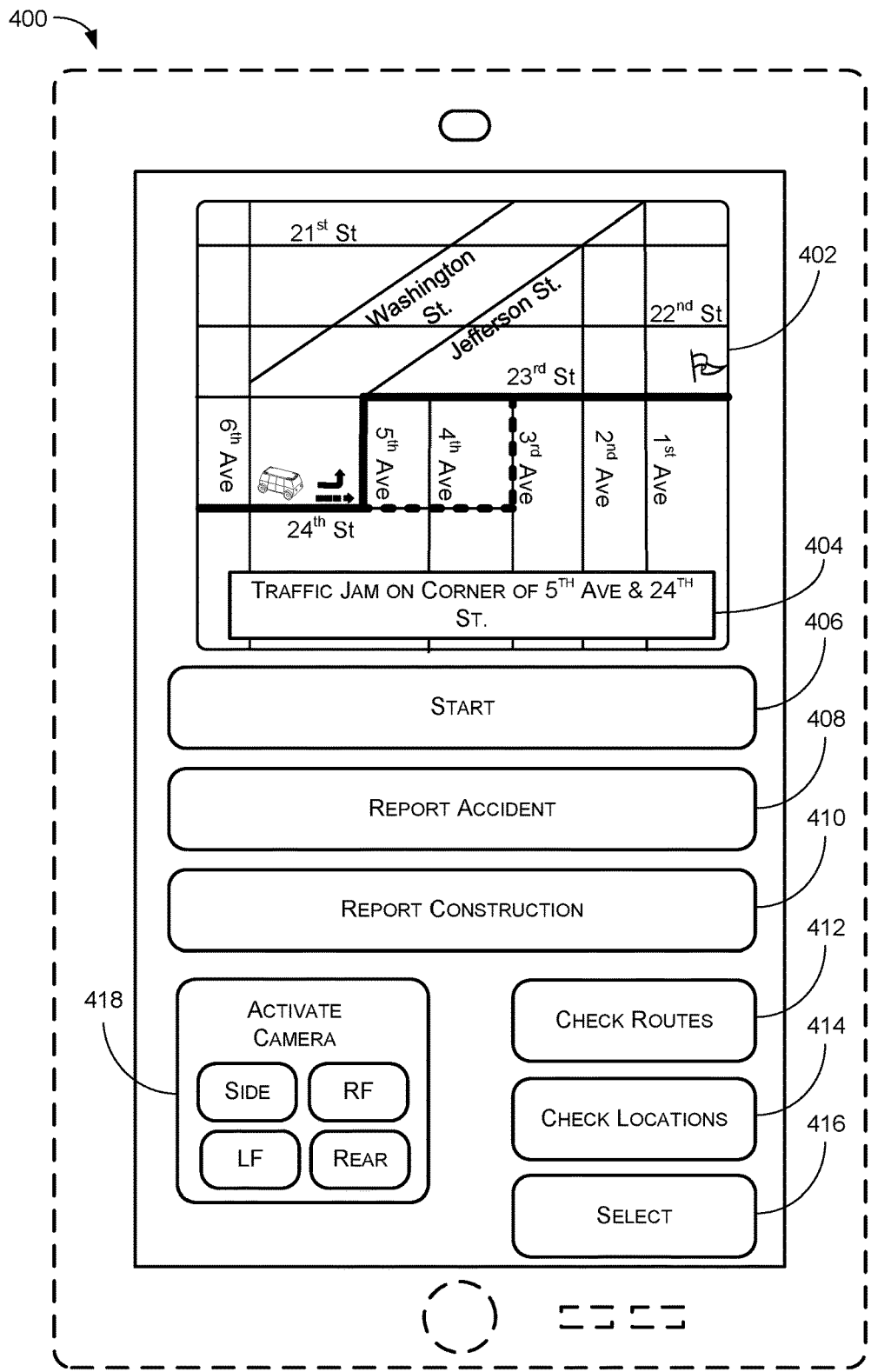
FIG. 4 illustrates an example display presenting an example notification of the event and the action of FIG. 3 that is responsive to the event.

FIG. 4 illustrates an example display 400 presenting an example notification of the traffic event 304 and trajectory 308 of FIG. 3 determined to achieve a desired outcome for the event.

In the example of FIG. 4, a map 402 depicting the geographical location of the autonomous vehicle 302 is presented on a display 400 (e.g., interior display(s) 296). The display 400 may be a display disposed on the interior of the autonomous vehicle 302, or on a display of a device associated with a passenger 106 of the autonomous vehicle 302. As illustrated, the map 402 shows the autonomous vehicle 302, the original trajectory 306 of the autonomous vehicle 302 and the alternate trajectory 308 taken by the autonomous vehicle 302. Further, the display 400 include text 404 that indicates the event type (e.g., traffic event 304) which caused the autonomous vehicle to take the alternate trajectory 308. The display 400 may further include selectable options for the passenger 106 to select. For instance, the passenger 106 may be presented with a "Start" option 406 to allow the passenger 106 to allow the autonomous vehicle system 102 to make the trajectory 308, a "Report Accident" option 408 to allow the passenger 106 to report an accident which may be causing the traffic event 304 to a remote service, a "Report Construction" option 410 to allow the passenger to report construction which may be causing the traffic event 304 to a remote service, a "Check Routes" option 412 to allow the passenger 106 to view other available routes, a "Check Locations" 414 option to allow the passenger 106 to view other potential traffic events, and a "Select" option 416 to allow the user to enter their selection of one of the various options. Additionally, the display 400 may present "Activate Camera" options 418 which allow the passenger 106 to view sensor data from various sensors of the autonomous vehicle 302 in the display 400. Thus, the example of FIG. 4 illustrates on technique for notifying a passenger 106 of an event and an action taken by the autonomous vehicle 302 to achieve an outcome for the event.

Figure 5:
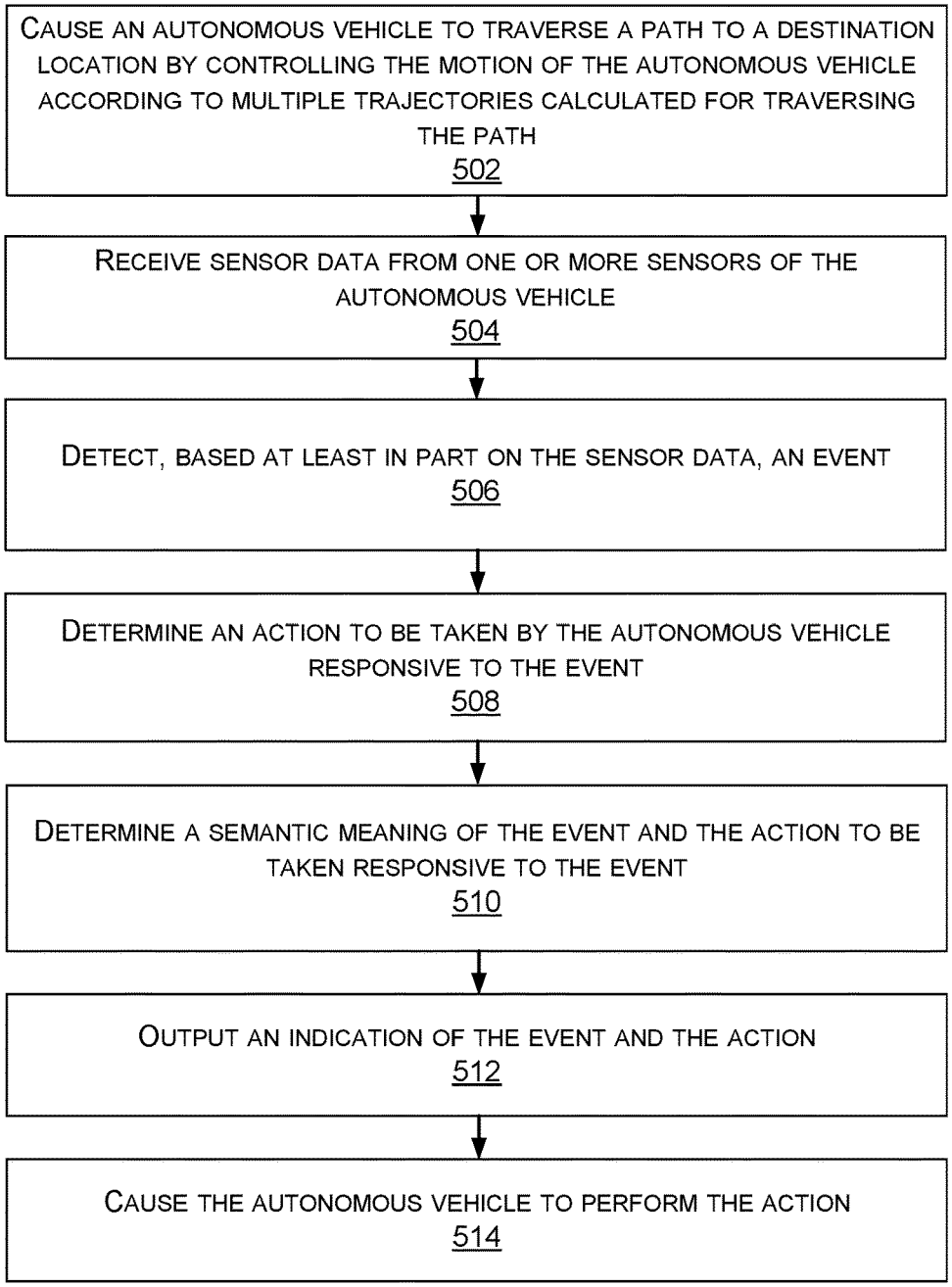
FIG. 5 illustrates an example process for determining events associated with an autonomous vehicle, determining actions responsive to the events, and notifying a passenger of the events and actions taken or to be taken.
Figure 6:
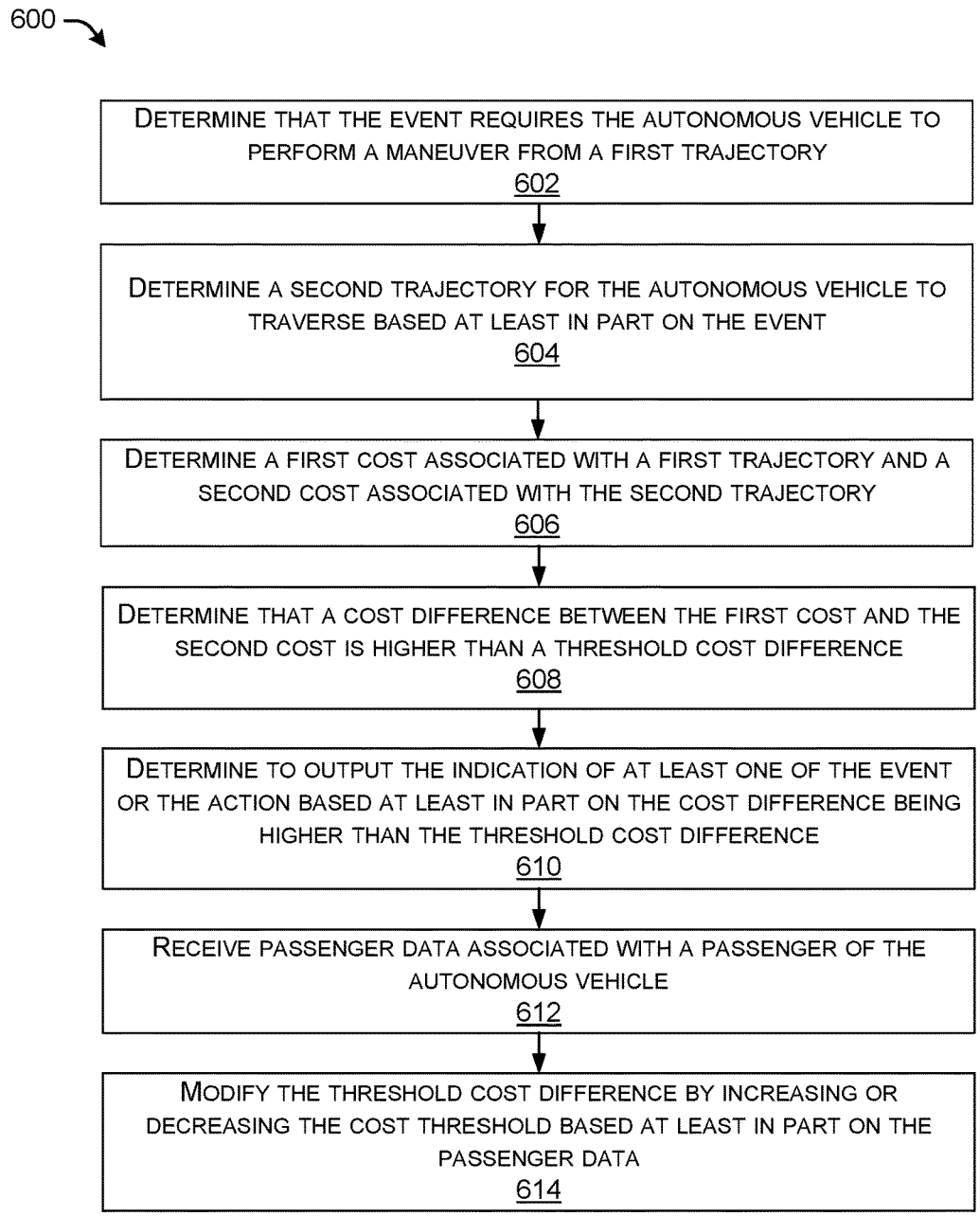
FIG. 6 illustrates an example process corresponding to operations of FIG. 5 for determining an action responsive to the event and determining to output the indication of the event and the action based on a cost associated with the action.

FIGS. 5 and 6 illustrate example processes for determining events associated with an autonomous vehicle, determining actions responsive to the events, and notifying a passenger of the events and actions taken. The processes may be performed by one or more of the modules and systems described herein. FIGS. 5 and 6 are described in the context of FIGS. 1-4, but are not limited to such contexts. The order in which the operations are described is not intended to be construed as a limitation, and any number of the described operations can be combined in any order and/or in parallel to implement the processes.

FIG. 5 illustrates an example process 500 for determining events associated with an autonomous vehicle, determining actions responsive to the events, and notifying a passenger of the events and actions taken or to be taken.

Block 502 illustrates causing an autonomous vehicle to traverse a path to a destination location. Such traversal may be accomplished by periodically determining a trajectory, the trajectory selected from a plurality of substantially simultaneously generated possible trajectories, and controlling the autonomous vehicle based at least in part on the trajectory. In some examples, the planner system 258 may determine the route and trajectories based on various data, such as the local pose data 246 and object data 256. The planner system 258 may then send control data 269 to the vehicle control system 270, which sends drive data 271 to the drive system 274 to cause the autonomous vehicle to traverse the path.

Block 504 illustrates receiving sensor data from one or more sensors of the autonomous vehicle. The sensor data may be received from the sensor system 212, such as from LIDAR(s) 216, image capture sensors 218 (e.g., camera(s)), radar(s) 220, sound capture sensor(s) 222 (e.g., microphone(s)), GPS/IMU 224, environmental sensors 226, and/or accelerometer/gyroscope 228. The sensor data may represent a scenario of an environment 238 in which the autonomous vehicle is located.

Block 506 illustrates detecting, based at least in part on the sensor data, an event. In some examples, the event may comprise detecting that a collision is likely to occur between the autonomous vehicle and an object in the environment. In some examples, the event may comprise detecting a traffic jam in the route of the autonomous vehicle. In further examples, the event may indicate insufficient data for the autonomous vehicle to proceed, causing the autonomous vehicle to contact a teleoperation service for help to negotiate the event.

Block 508 illustrates determining an action to be taken by the autonomous vehicle responsive to the event. For example, the planner system 258 may determine an action including at least one of a changing from a first trajectory to a second trajectory, a safe stop, decreasing acceleration of the autonomous vehicle, increasing acceleration of the autonomous vehicle, emitting a sound from the one or more exterior output devices of the autonomous vehicle, outputting light from the one or more exterior output devices of the autonomous vehicle, or communicating with a teleoperation service for assistance. As another example, the planner system 258 may determine an alternate route and trajectory to take to avoid a traffic jam. In some examples, the event may comprise determining that a battery of the autonomous vehicle 110 is low or insufficient, and the action may be pulling over to the side of the road to contact a teleoperation service.

In some examples, block 508 may include operations included in block 502. For example, determining the action to take be accomplished by periodically determining a trajectory, the trajectory selected from a plurality of substantially simultaneously generated possible trajectories, and controlling the autonomous vehicle based at least in part on the trajectory. In some examples, the planner system 258 may determine the route and trajectories based on various data, such as the local pose data 246 and object data 256. The planner system 258 may then send control data 269 to the vehicle control system 270, which sends drive data 271 to the drive system 274 to cause the autonomous vehicle to traverse the path.

Block 510 illustrates determining a semantic meaning of the event and the action to be taken responsive to the event. In some examples, determining the semantic meaning of the event may include analyzing a database storing a list of LTL formulae, each formula comprising predicates and/or symbols and associated with a semantic meaning and a method for outputting the indication of the event and/or the action.

Block 512 illustrates outputting, by the one or more output devices, an indication of the event and/or action performed by the autonomous vehicle. In some examples, the one or more output devices may include at least one of a speaker, a display, a light emitter, a seat belt tensioning device, a seat actuator, or a projector. Depending on the type of event and/or action determined, outputting the indication of the event and/or the action may be performed using various techniques. For example, outputting the indication of the event and/or the action performed by the autonomous vehicle may comprise one or more of outputting, by a speaker, an alert sound, outputting, by the speaker, sound including a word or phrase describing at least one of the event or the action, outputting, by a display, text including the word or phrase describing the at least one of the event or the action, outputting, by the display, a graphical representation of the event and the action on the display, causing a seat belt tensioning device to tighten a seatbelt of a passenger, causing a seat actuator to actuate a seat of a passenger, causing a light emitter to flash a light on and off, or causing the light emitter to change a color of light being emitted. In some examples, based on the type of event and timing of the event, the autonomous vehicle may further determine whether to output the indication of the event and/or the action before, during, or after performing the action. In some examples, the indication may be output within a predetermined threshold period (e.g., 1 second, 5 seconds, 10 seconds, etc.) after, or before, performing the action. In this way, a passenger of the autonomous vehicle may be notified of an event and/or action with enough time to prepare for a potential action prior to the action being taken. Additionally, this may allow a user to recover from an action taken before having to absorb an output notification of the action and event.

Block 514 illustrates causing the autonomous vehicle to perform the action.

FIG. 6 illustrates an example process 600 corresponding to operations of FIG. 5 for determining a trajectory (e.g., action) for the event and determining to output the indication of the event and the action based on a cost associated with the trajectory event.

The process 600 may be performed following the actions performed at blocks 502, 504, and 506.

Block 602 illustrates determining that the event requires the autonomous vehicle to alter a first trajectory. For example, modules of the autonomous vehicle may determine that there is a high probability of collision between the autonomous vehicle and an object in the environment. In such an example, one or more modules may determine an action to perform is maneuvering from the first trajectory to a second trajectory.

Block 604 illustrates determining a second trajectory for the autonomous vehicle to traverse based at least in part on the event. For example, the planner system 258 of the autonomous vehicle may determine one or more trajectory calculations 259 which result in the autonomous vehicle avoiding the collision with the object in the environment.

Block 606 illustrates determining a first cost associated with the first trajectory and a second cost associated with the second trajectory.

Block 608 illustrates determining that a cost difference between the first cost and the second cost is higher than a threshold cost difference. In some examples, determining that the cost difference is higher than the threshold cost difference may include determining one or more of a change in the magnitude of acceleration in the second trajectory relative to the first trajectory, a number of turns added or removed from the path by the second trajectory, a change in a distance of the path due to the second trajectory, a change in time required to traverse the path due to the second trajectory, a change in an amount of power required to traverse the path due to the second trajectory, one or more traffic rules associated with performing the second trajectory, etc.

In some examples, the cost difference indicates a cost of the second trajectory with respect to the first trajectory. In other words, the cost difference illustrates how costly a change in course to address the event is. The threshold cost difference may generally comprise an "acceptable" threshold that, if the cost difference is lower than the threshold cost difference, the event and action may not need to be reported to the passenger. For instance, braking slightly earlier at a stop light than originally planned may not be reported to a passenger as there is very little cost with braking slightly earlier. Conversely, if the cost difference is higher than the threshold cost difference, the difference between the first trajectory and the second trajectory is large enough that it warrants notifying the passenger of the event and maneuver.

Block 610 illustrates determining to output the indication of at least one of the event or the action based at least in part on the cost difference being higher than the threshold cost difference. Thus, at block 610 it may be determined that, because the cost difference was higher than the threshold cost difference, the event and action should be reported to the passenger.

Block 612 illustrates receiving passenger data associated with a passenger of the autonomous vehicle. The passenger data may comprise one or more of a number of times the passenger has ridden in an autonomous vehicle, an indication of types of events and actions experienced by the passenger in previous rides in an autonomous vehicle, an age of the passenger, a profession of the passenger, a geographic location of a residence of the passenger, or user preferences for the passenger. In some examples, an application on a user device may be used to collect this data.

Block 614 illustrates modifying the threshold cost difference by increasing or decreasing the cost threshold based at least in part on the passenger data. For example, if a passenger has ridden in an autonomous vehicle over a certain number of times, the cost threshold may be raised as less events and maneuvers need to be reported to the passenger to establish trust. In some examples, certain age groups (e.g., elderly) may have a lower cost threshold as they may not be as trusting of autonomous vehicles and require additional feedback to build trust. Similarly, passengers who live in rural locations may require additional feedback regarding actions of the autonomous vehicle compared to passengers who live in urban locations, and the threshold cost difference may be adjusted accordingly.

EXAMPLE CLAUSES

A. An autonomous vehicle comprising: one or more processors; one or more interior output devices disposed in an interior of the autonomous vehicle; one or more sensors to provide data related to an environment of the autonomous vehicle; and one or more computer-readable media storing computer-executable instructions that, when executed by the one or more processors, cause the one or more processors to perform acts comprising: causing the autonomous vehicle to traverse a path to a destination location by controlling the motion of the autonomous vehicle according to multiple trajectories calculated for traversing the path; receiving sensor data from the one or more sensors; detecting, based at least in part on the sensor data, an event; determining an action to be taken by the autonomous vehicle responsive to the event; determining a semantic meaning of the event and the action to be taken responsive to the event; outputting, by the one or more interior output devices, an indication of the event and the action; and causing the autonomous vehicle to perform the action.

B. The autonomous vehicle as paragraph A recites, wherein the action comprises at least one of: a maneuver changing from a first trajectory to a second trajectory, the second trajectory being different than the first trajectory; a safe stop; altering the path; decreasing acceleration of the autonomous vehicle; increasing acceleration of the autonomous vehicle; emitting a sound from one or more exterior output devices of the autonomous vehicle; outputting light from one or more exterior output devices of the autonomous vehicle; or communicating with a teleoperation service for assistance.

C. The autonomous vehicle as paragraph A or B recites, wherein determining the semantic meaning of the event and the action to be taken responsive to the event comprises: analyzing a database storing a mapping of formulae to templates; identifying a template from the database associated with a formula describing one or more of the event or the action to be taken; wherein the template comprises a method for outputting the indication; and further wherein the formulae comprise one or more of predicates or symbols describing the event or the action.

D. The autonomous vehicle as any of paragraphs A-C recite, wherein determining the semantic meaning of the event and the action to be taken responsive to the event comprises: inputting at least a portion of the sensor data into one or more machine learning algorithms; executing the one or more machine learning algorithms; and receiving, as output from the one or more machine learning algorithms, one or more semantic classifications for one or more objects detected in the environment of the autonomous vehicle.

E. The autonomous vehicle as any of paragraphs A-D recite, wherein the one or more interior output devices of the autonomous vehicle comprise at least one of: a speaker; a display; a light emitter; a seat belt tensioning device; a seat actuator; or a projector.

F. The autonomous vehicle as paragraph E recites, wherein outputting the indication of the event and the action comprises at least one of: outputting, by the speaker, an alert sound; causing the seat belt tensioning device to tighten a seatbelt of a passenger; causing the seat actuator to actuate a seat of a passenger; causing the light emitter to flash light on or off; or causing the light emitter to change a color of light being emitted.

G. The autonomous vehicle as paragraph E recites, wherein outputting the indication comprises at least one of: outputting, by the speaker, sound including a word or phrase describing at least one of the event or the action; outputting, by the display, text including the word or phrase describing the at least one of the event or the action; or outputting, by the display, a graphical representation of at least one of the event or the maneuver on the display.

H. The autonomous vehicle as any of paragraphs A-G recite, wherein outputting the indication comprises at least one of: outputting the indication prior to causing the autonomous vehicle to perform the action; outputting the indication while causing the autonomous vehicle to perform the action; or outputting the indication after causing the autonomous vehicle to perform the action.

I. The autonomous vehicle as any of paragraphs A-H recite, the acts further comprising: receiving passenger data associated with a passenger of the autonomous vehicle, the passenger data including at least one of: a number of times the passenger has ridden in an autonomous vehicle; an indication of types of events and actions experienced by the passenger in previous rides in an autonomous vehicle; an age of the passenger; a profession of the passenger; an emotional response of the passenger, the emotional response determined based at least in part on interior sensor data; a geographic location of a residence of the passenger; or user preferences for the passenger; and determining whether to output the indication of the event and the action based at least in part on the passenger data.

J. The autonomous vehicle as any of paragraphs A-I recite, the acts further comprising: determining a cost associated with the action based on one or more cost factors, the one or more cost factors including: a change in a magnitude of acceleration associated with the action; a change in a direction of acceleration associated with the action; a number of turns added or removed from the path due to the action; a change in a distance of the path due to the action; a change in an amount of power required to traverse the path due to the action; or one or more traffic rules associate with the action; and determining whether to output the indication of the event and the action based at least in part on the cost associated with the action.

K. A system comprising: one or more processors; one or more interior output devices disposed in an interior of an autonomous vehicle; one or more sensors to provide data related to an environment of the autonomous vehicle; and one or more computer-readable media storing computer-executable instructions that, when executed by the one or more processors, cause the one or more processors to perform acts comprising: causing the autonomous vehicle to traverse a path by controlling the motion of the autonomous vehicle according to multiple trajectories calculated for traversing the path; receiving sensor data from the one or more sensors; detecting, based at least in part on the sensor data, an event; determining an action to be taken by the autonomous vehicle responsive to the event; outputting, by the one or more interior output devices, an indication of at least one of the event or the action, wherein outputting the indication comprises at least one of: outputting, by a speaker of the one or more interior output devices, sound including a word or phrase describing the at least one of the event or the action; outputting, by a display of the one or more interior output devices, text including the word or phrase describing the at least one of the event or the action; or outputting, by the display, a graphical representation of the at least one of the event or the action; and causing the autonomous vehicle to perform the action, wherein detecting an event comprises evaluation of one or more linear temporal logic formulae.

L. The system as paragraph K recites, wherein determining the action to be taken by the autonomous vehicle comprises: determining that the event requires the autonomous vehicle to maneuver from a first trajectory to a second trajectory, the second trajectory being different than the first trajectory, wherein causing the autonomous vehicle to perform the action comprises causing the autonomous vehicle to perform the maneuver by controlling the motion of the autonomous vehicle according to the second trajectory.

M. The system as paragraph L recites, the acts further comprising: determining a first cost associated with the first trajectory; determining a second cost associated with the second trajectory; determining that a cost difference between the first cost and the second cost is higher than a threshold cost difference; and determining to output the indication based at least in part on the cost difference being higher than the threshold cost difference.

N. The system as paragraph M recites, the acts further comprising: receiving passenger data associated with a passenger of the autonomous vehicle, the passenger data including at least one of: a number of times the passenger has ridden in an autonomous vehicle; an indication of types of events and actions experienced by the passenger in previous rides in an autonomous vehicle; an age of the passenger; a profession of the passenger; a geographic location of a residence of the passenger; or user preferences for the passenger; and modifying the threshold cost difference based at least in part on the passenger data.

O. The system as any of paragraphs K-N recite, further comprising one or more interior sensors disposed on an interior of the autonomous vehicle, the acts further comprising: receiving interior sensor data from the one or more interior sensors; analyzing the interior sensor data to identify a physical response of a passenger of the autonomous vehicle; and determining to output the indication of at least one of the event or the action based at least in part on identifying the physical response of the passenger.

P. The system as any of paragraphs K-O recite, wherein outputting the indication of at least one of the event or the action further comprises at least one of: outputting, by a speaker included in the one or more interior output devices, an alert sound; causing a seat belt tensioning device included in the one or more interior output devices to tighten a seatbelt of a passenger; causing a seat actuator included in the one or more interior output devices to actuate a seat of a passenger; causing a light emitter included in the one or more interior output devices to flash light one and off; or causing the light emitter to change a color of light being emitted.

Q. A method comprising: causing an autonomous vehicle to traverse a path by controlling the motion of the autonomous vehicle according to multiple trajectories calculated for traversing the path; detecting, based on data obtained from one or more external sensors of the autonomous vehicle, an event based at least in part of evaluation of one or more linear temporal logic formulae; determining an action to be taken by the autonomous vehicle responsive to the event based at least in part of evaluation of one or more linear temporal logic (LTL) formulae; determining a semantic meaning of the event and the action to be taken responsive to the event; outputting, by the one or more interior output devices, an indication of one or more of the event or the action; and causing the autonomous vehicle to perform the action.

R. The method as paragraph Q recites, wherein determining the semantic meaning of the event and the action to be taken responsive to the event comprises identifying an LTL formula comprising one or more predicates or symbols describing the event, the formula being associated with one or more templates, the templates comprising a human understandable description of at least one of the event or the action, the description comprising one or more words.

S. The method as paragraph R recites, wherein outputting the indication of the event and the action comprises at least one of: outputting, by a speaker disposed on an interior of the autonomous vehicle, sound including the one or more words; or outputting, by a display disposed on an interior of the autonomous vehicle, text including the one or more words.

T. The method as any of paragraphs Q-S recite, wherein determining the semantic meaning of the event and the action to be taken responsive to the event comprises: inputting at least a portion of the data into one or more machine learning algorithms; executing the one or more machine learning algorithms; and receiving, as output from the one or more machine learning algorithms, one or more semantic classifications for one or more objects detected in an environment of the autonomous vehicle.

U. The method as any of paragraphs Q-T recite, further comprising: receiving an audio signal generated by one or more microphones disposed in an interior of the autonomous vehicle, the audio signal representing sound captured from the interior of the autonomous vehicle; and performing natural language processing on the audio signal to identify a request from a passenger for information regarding the event or the action, wherein outputting the indication is based at least in part on identifying the request from the passenger for information.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. An autonomous vehicle comprising:
one or more processors;
one or more interior output devices disposed in an interior of the autonomous vehicle;
one or more sensors to provide data related to an environment of the autonomous vehicle; and
one or more computer-readable media storing computer-executable instructions that, when executed by the one or more processors, cause the one or more processors to perform acts comprising:
causing the autonomous vehicle to traverse a path to a destination location by controlling the motion of the autonomous vehicle according to multiple trajectories calculated for traversing the path;
receiving sensor data from the one or more sensors;
detecting, based at least in part on the sensor data, an event;
determining an action to be taken by the autonomous vehicle responsive to the event;
determining a semantic meaning of the event and the action to be taken responsive to the event;
outputting, by the one or more interior output devices, an indication of the event and the action; and
causing the autonomous vehicle to perform the action.
2. The autonomous vehicle of claim 1, wherein the action comprises at least one of:
a maneuver changing from a first trajectory to a second trajectory, the second trajectory being different than the first trajectory;
a safe stop;
altering the path;
decreasing acceleration of the autonomous vehicle;
increasing acceleration of the autonomous vehicle;
emitting a sound from one or more exterior output devices of the autonomous vehicle;
outputting light from one or more exterior output devices of the autonomous vehicle; or
communicating with a teleoperation service for assistance.
3. The autonomous vehicle of claim 1, wherein determining the semantic meaning of the event and the action to be taken responsive to the event comprises:
analyzing a database storing a mapping of formulae to templates;

identifying a template from the database associated with a formula describing one or more of the event or the action to be taken;
wherein the template comprises a method for outputting the indication; and
further wherein the formulae comprise one or more predicates or symbols describing the event or the action.

4. The autonomous vehicle of claim 1, wherein determining the semantic meaning of the event and the action to be taken responsive to the event comprises:
inputting at least a portion of the sensor data into one or more machine learning algorithms;
executing the one or more machine learning algorithms; and
receiving, as output from the one or more machine learning algorithms, one or more semantic classifications for one or more objects detected in the environment of the autonomous vehicle.

5. The autonomous vehicle of claim 1, wherein the one or more interior output devices of the autonomous vehicle comprise at least one of:
a speaker;
a display;
a light emitter;
a seat belt tensioning device;
a seat actuator; or
a projector.

6. The autonomous vehicle of claim 5, wherein outputting the indication of the event and the action comprises at least one of:
outputting, by the speaker, an alert sound;
causing the seat belt tensioning device to tighten a seatbelt of a passenger;
causing the seat actuator to actuate a seat of a passenger;
causing the light emitter to flash light on or off; or
causing the light emitter to change a color of light being emitted.

7. The autonomous vehicle of claim 5, wherein outputting the indication comprises at least one of:
outputting, by the speaker, sound including a word or phrase describing at least one of the event or the action;
outputting, by the display, text including the word or phrase describing the at least one of the event or the action; or
outputting, by the display, a graphical representation of at least one of the event or the maneuver on the display.

8. The autonomous vehicle of claim 1, wherein outputting the indication comprises at least one of:
outputting the indication prior to causing the autonomous vehicle to perform the action;
outputting the indication while causing the autonomous vehicle to perform the action; or
outputting the indication after causing the autonomous vehicle to perform the action.

9. The autonomous vehicle of claim 1, the acts further comprising:
receiving passenger data associated with a passenger of the autonomous vehicle, the passenger data including at least one of:
a number of times the passenger has ridden in an autonomous vehicle;
an indication of types of events and actions experienced by the passenger in previous rides in an autonomous vehicle;
an age of the passenger;
a profession of the passenger;
an emotional response of the passenger, the emotional response determined based at least in part on interior sensor data;
a geographic location of a residence of the passenger; or
user preferences for the passenger; and
determining whether to output the indication of the event and the action based at least in part on the passenger data.

10. The autonomous vehicle of claim 1, the acts further comprising:
determining a cost associated with the action based on one or more cost factors, the one or more cost factors including:
a change in a magnitude of acceleration associated with the action;
a change in a direction of acceleration associated with the action;
a number of turns added or removed from the path due to the action;
a change in a distance of the path due to the action;
a change in an amount of power required to traverse the path due to the action; or
one or more traffic rules associate with the action; and
determining whether to output the indication of the event and the action based at least in part on the cost associated with the action.

11. A system comprising:
one or more processors;
one or more interior output devices disposed in an interior of an autonomous vehicle;
one or more sensors to provide data related to an environment of the autonomous vehicle; and
one or more computer-readable media storing computer-executable instructions that, when executed by the one or more processors, cause the one or more processors to perform acts comprising:
causing the autonomous vehicle to traverse a path by controlling the motion of the autonomous vehicle according to multiple trajectories calculated for traversing the path;
receiving sensor data from the one or more sensors;
detecting, based at least in part on the sensor data, an event;
determining an action to be taken by the autonomous vehicle responsive to the event;
outputting, by the one or more interior output devices, an indication of at least one of the event or the action, wherein outputting the indication comprises at least one of:
outputting, by a speaker of the one or more interior output devices, sound including a word or phrase describing the at least one of the event or the action;
outputting, by a display of the one or more interior output devices, text including the word or phrase describing the at least one of the event or the action; or
outputting, by the display, a graphical representation of the at least one of the event or the action; and
causing the autonomous vehicle to perform the action, wherein detecting an event comprises evaluation of one or more linear temporal logic formulae.

12. The system of claim 11, wherein determining the action to be taken by the autonomous vehicle comprises:
determining that the event requires the autonomous vehicle to perform a maneuver from a first trajectory to a second trajectory, the second trajectory being different than the first trajectory,
wherein causing the autonomous vehicle to perform the action comprises causing the autonomous vehicle to perform the maneuver by controlling the motion of the autonomous vehicle according to the second trajectory.

13. The system of claim 12, the acts further comprising:
determining a first cost associated with the first trajectory;
determining a second cost associated with the second trajectory;
determining that a cost difference between the first cost and the second cost is higher than a threshold cost difference; and
determining to output the indication based at least in part on the cost difference being higher than the threshold cost difference.

14. The system of claim 13, the acts further comprising:
receiving passenger data associated with a passenger of the autonomous vehicle, the passenger data including at least one of:
  a number of times the passenger has ridden in an autonomous vehicle;
  an indication of types of events and actions experienced by the passenger in previous rides in an autonomous vehicle;
  an age of the passenger;
  a profession of the passenger;
  a geographic location of a residence of the passenger; or
  user preferences for the passenger; and
modifying the threshold cost difference based at least in part on the passenger data.

15. The system of claim 11, further comprising one or more interior sensors disposed on an interior of the autonomous vehicle,
the acts further comprising:
  receiving interior sensor data from the one or more interior sensors;
  analyzing the interior sensor data to identify a physical response of a passenger of the autonomous vehicle; and
  determining to output the indication of at least one of the event or the action based at least in part on identifying the physical response of the passenger.

16. The system of claim 11, wherein outputting the indication of at least one of the event or the action further comprises at least one of:
  outputting, by a speaker included in the one or more interior output devices, an alert sound;
  causing a seat belt tensioning device included in the one or more interior output devices to tighten a seatbelt of a passenger;
  causing a seat actuator included in the one or more interior output devices to actuate a seat of a passenger;
  causing a light emitter included in the one or more interior output devices to flash light one and off; or
  causing the light emitter to change a color of light being emitted.

17. A method comprising:
causing an autonomous vehicle to traverse a path by controlling the motion of the autonomous vehicle according to multiple trajectories calculated for traversing the path;
detecting, based on data obtained from one or more external sensors of the autonomous vehicle, an event based at least in part of evaluation of one or more linear temporal logic (LTL) formulae;
determining an action to be taken by the autonomous vehicle responsive to the event based at least in part of evaluation of one or more LTL formulae;
determining a semantic meaning of the event and the action to be taken responsive to the event;
outputting, by one or more interior output devices, an indication of one or more of the event or the action; and
causing the autonomous vehicle to perform the action.

18. The method of claim 17, wherein determining the semantic meaning of the event and the action to be taken responsive to the event comprises identifying an LTL formula comprising one or more predicates or symbols describing the event, the formula being associated with one or more templates, the templates comprising a human understandable description of at least one of the event or the action, the description comprising one or more words.

19. The method of claim 18, wherein outputting the indication of the one or more of the event or the action comprises at least one of:
  outputting, by a speaker disposed on an interior of the autonomous vehicle, sound including the one or more words; or
  outputting, by a display disposed on an interior of the autonomous vehicle, text including the one or more words.

20. The method of claim 17, wherein determining the semantic meaning of the event and the action to be taken responsive to the event comprises:
  inputting at least a portion of the data into one or more machine learning algorithms;
  executing the one or more machine learning algorithms; and
  receiving, as output from the one or more machine learning algorithms, one or more semantic classifications for one or more objects detected in an environment of the autonomous vehicle.

21. The method of claim 17, further comprising:
receiving an audio signal generated by one or more microphones disposed in an interior of the autonomous vehicle, the audio signal representing sound captured from the interior of the autonomous vehicle; and
performing natural language processing on the audio signal to identify a request from a passenger for information regarding the event or the action,
wherein outputting the indication is based at least in part on identifying the request from the passenger for information.

* * * * *